United States Patent [19]
Wong

[11] Patent Number: 5,930,159
[45] Date of Patent: Jul. 27, 1999

[54] RIGHT-SHIFTING AN INTEGER OPERAND AND ROUNDING A FRACTIONAL INTERMEDIATE RESULT TO OBTAIN A ROUNDED INTEGER RESULT

[75] Inventor: Roney S. Wong, Sunnyvale, Calif.

[73] Assignee: Samsung Electronics Co., Ltd, Seoul, Rep. of Korea

[21] Appl. No.: 08/731,652

[22] Filed: Oct. 17, 1996

[51] Int. Cl.[6] .................................. G06F 7/38; G06F 7/00
[52] U.S. Cl. .................................. 364/745.01; 364/715.08
[58] Field of Search ........................ 364/715.04, 715.08, 364/745.01, 745.02, 745.03, 745.04, 748.03, 748.04, 748.05, 761, 764

[56] References Cited

U.S. PATENT DOCUMENTS

| | | | |
|---|---|---|---|
| 4,218,751 | 8/1980 | McManigal | 364/784 |
| 4,589,084 | 5/1986 | Fling et al. | 364/745.02 |
| 4,931,970 | 6/1990 | Cook et al. | 364/715.08 |
| 5,198,993 | 3/1993 | Makakura | 364/788 |
| 5,214,598 | 5/1993 | Hammerstrom | 364/745.02 |
| 5,282,153 | 1/1994 | Bartkowiak et al. | 364/716 |
| 5,329,475 | 7/1994 | Juri et al. | 364/745.02 |
| 5,373,459 | 12/1994 | Taniguchi | 364/715.01 |
| 5,428,567 | 6/1995 | Horvath et al. | 365/78 |
| 5,440,702 | 8/1995 | Brewer et al. | 395/564 |
| 5,481,553 | 1/1996 | Suzuki et al. | 371/49.1 |
| 5,555,202 | 9/1996 | Chu | 364/715.08 |

OTHER PUBLICATIONS

"Programming The 80386" by Crawford et al., published by SYBEX Inc., 1987, pp. 241–244 and 405–406.

"Computer Arithmetic Systems: Algorithms, Architecture and Implementations" by A. Omondi, published by Prentice Hall International (UK) Limited, 1994, pp. 505–513.

Primary Examiner—Chuong Dinh Ngo
Attorney, Agent, or Firm—Skerven, Morrill, MacPherson, Franklin & Friel LLP

[57] ABSTRACT

A method and apparatus for right-shifting a signed or unsigned integer operand and rounding a fractional intermediate result towards or away from zero to obtain an integer result as prescribed by the MPEG standard in a single instruction cycle is disclosed. The apparatus includes a right-shifter for right-shifting the operand to obtain a fractional intermediate result that includes integer bits and fractional bits. The apparatus also includes a control circuit for generating an increment signal in response to a sign bit of the operand, the fractional bits, a mode signal indicative of whether the operand is signed or unsigned, and a round signal indicative of whether round towards zero or round away from zero is selected. The apparatus also includes an increment circuit for incrementing the integer bits and providing the incremented integer bits as the integer result when the increment signal has a first logical value, and for providing the integer bits as the integer result when the increment signal has a second logical value.

54 Claims, 9 Drawing Sheets

RIGHT-SHIFTING AN INTEGER OPERAND AND ROUNDING A FRACTIONAL INTERMEDIATE RESULT TO OBTAIN A ROUNDED INTEGER RESULT

BACKGROUND OF THE INVENTION

1. Field of the Invention

The present invention relates to computer arithmetic, and more particularly to right-shifting an integer operand and rounding a fractional intermediate result towards or away from zero.

2. Description of Related Art

The Moving Picture Experts Group (MPEG) standard has emerged as the dominant standard for compressed digital video. The MPEG-1 standard specifies a compressed video bit-stream rate of approximately 1.5 megabits per second, and a compressed stereo audio bit-stream rate of approximately 250 kilobits per second. The second standard, MPEG-2, will specify compression rates for higher-bandwidth distribution media, and is in the process of being formalized. To meet the MPEG standard, video and audio compression and decompression products must rapidly process the various algorithms used to implement the MPEG standard.

Conventional right-shifters are used for fast division by $2^N$ where N is an unsigned integer. Such shifters exploit the fact the operands represented in binary form are composed of bit positions that differ by powers of two. For instance, the bit positions of a four-bit unsigned binary operand typically represent $2^3$, $2^2$, $2^1$ and $2^0$. Therefore, division by $2^N$ can be implemented by right-shifting the operand by N bit positions. When an unsigned operand is right-shifted the most significant bit (MSB) position is filled with a zero, and when a signed operand (in 2's complement form) is right-shifted the MSB position is filled with the MSB (or sign bit) of the operand. The right-shifter is usually not large enough to store the entire shifted operand. Consequently, operand bits are often shifted-out and discarded, and the result is not always numerically correct. Moreover, often no provision is made for a correctly rounded integer result. Various examples of signed operands applied to a conventional right-shifter and right-shifted by one and two bit positions are listed below in Tables 1 and 2.

TABLE 1

SIGNED BINARY OPERANDS APPLIED TO CONVENTIONAL RIGHT-SHIFTER AND RIGHT-SHIFTED BY ONE BIT POSITION

| Binary Operand (Decimal) | Binary Operand Right-Shifted by One Bit Position - Actual Value (Decimal) | Binary Operand Right-Shifted by One Bit Position After Discarding Shifted-Out Bit (Decimal) | Rounding Error (Decimal) |
|---|---|---|---|
| 0100 (decimal 4) | 0010.0 (decimal 2) | 0010 (decimal 2) | 0 (decimal 0) |
| 0011 (decimal 3) | 0001.1 (decimal 1.5) | 0001 (decimal 1) | −0.1 (decimal −0.5) |
| 0010 (decimal 2) | 0001.0 (decimal 1) | 0001 (decimal 1) | 0 (decimal 0) |
| 0001 (decimal 1) | 0000.1 (decimal 0.5) | 0000 (decimal 0) | −0.1 (decimal −0.5) |
| 1111 (decimal −1) | 1111.1 (decimal −0.5) | 1111 (decimal −1) | −0.1 (decimal −0.5) |
| 1110 (decimal −2) | 1111.0 (decimal −1) | 1111 (decimal −1) | 0 (decimal 0) |
| 1101 (decimal −3) | 1110.0 (decimal −1.5) | 1110 (decimal −2) | −0.01 (decimal −0.5) |
| 1100 (decimal −4) | 1110.0 (decimal −2) | 1110 (decimal −2) | 0 (decimal 0) |
| 1011 (decimal −5) | 1101.1 (decimal −2.5) | 1101 (decimal −3) | −0.1 (decimal −0.5) |

TABLE 2

SIGNED BINARY OPERANDS APPLIED TO CONVENTIONAL RIGHT-SHIFTER AND RIGHT-SHIFTED BY TWO BIT POSITIONS

| Binary Operand (Decimal) | Binary Operand Right-Shifted by Two Bit Positions - Actual Value (Decimal) | Binary Operand Right-Shifted by Two Bit Positions After Discarding Shifted Out Bits (Decimal) | Rounding Error (Decimal) |
|---|---|---|---|
| 0100 (decimal 4) | 0001.00 (decimal 1) | 0001 (decimal 1) | 0 (decimal 0) |
| 0011 (decimal 3) | 0000.11 (decimal 0.75) | 0000 (decimal 0) | −0.11 (decimal −0.75) |
| 0010 (decimal 2) | 0000.10 (decimal 0.5) | 0000 (decimal 0) | −0.10 (decimal −0.5) |
| 0001 (decimal 1) | 0000.01 (decimal 0.25) | 0000 (decimal 0) | −0.01 (decimal −0.25) |
| 1111 (decimal −1) | 1111.11 (decimal −0.25) | 1111 (decimal −1) | −0.11 (decimal −0.75) |
| 1110 (decimal −2) | 1111.10 (decimal −0.5) | 1111 (decimal −1) | −0.10 (decimal −0.5) |
| 1101 (decimal −3) | 1111.01 (decimal −0.75) | 1111 (decimal −1) | −0.01 (decimal −0.25) |
| 1100 (decimal −4) | 1111.00 (decimal −1) | 1111 (decimal −1) | 0 (decimal 0) |
| 1011 (decimal −5) | 1110.11 (decimal −1.25) | 1110 (decimal −2) | −0.11 (decimal −0.75) |

Tables 1 and 2 demonstrate that right-shifting an operand and discarding the shifted-out bit(s) leads to rounding towards minus infinity. That is, all non-integers are rounded towards the next smallest integer. For instance, right-shifting 0011 (decimal 3) by one bit position yields an actual value of 0001.1 (decimal 1.5), but discarding the shifted-out bit yields 0001 (decimal 1) with a rounding error of −0.1 (decimal −0.5). Right-shifting 1101 (decimal −3) by one bit position yields an actual value of 1110.1 (decimal −1.5), but discarding the shifted-out bit yields 1110 (decimal −2) with a rounding error of −0.1 (decimal −0.5). Right-shifting 0011 (decimal 3) by two bit positions yields an actual value of 0000.11 (decimal 0.75), but discarding the shifted-out bits yields 0000 (decimal 0) with a rounding error of −0.11 (decimal −0.75). Right-shifting 1101 (decimal −3) by two bit positions yields an actual value of 1111.01 (decimal −0.75), but discarding the shifted-out bits yields 1111 (decimal −1) with a rounding error of −0.01 (decimal −0.25).

In Tables 1 and 2, it is noted that the signed operands are represented in 2's complement form, and thus all bits except the sign bit have positive value. Furthermore, the shift length is not large enough to shift-out the sign bit. Therefore, since the shifted-out bits (or fractional bits) always have positive value, the rounding error is always in the direction of minus infinity.

Rounding towards minus infinity is generally undesirable since it introduces a bias towards minus infinity after repeated computations and rounding. The MPEG standard recognizes this problem. As a result, the MPEG standard defines two numerically unbiased rounding modes—"round towards zero" and "round away from zero". In round towards zero, numbers with a fractional component are rounded towards zero. That is, the integer component is left intact and the fractional component is truncated. In round away from zero, numbers with a fractional component are rounded to the closest integer, and numbers with a fractional component of a half-integer (the "tie case") are rounded away from zero. That is, when the number is positive and the fractional component is greater than or equal to one-half then the integer component is rounded up (towards plus infinity), when the number is positive and the fractional component is less than one-half then the integer component is left intact, when the number is negative and the absolute value of the fractional component is greater than or equal to one-half then the integer component is rounded up (towards minus infinity), and when the number is negative and the absolute value of the fractional component is less than one-half then the integer component is left intact.

Moreover, the MPEG standard defines "/" as integer division rounded towards zero, and "//" as integer division rounded away from zero. Various examples of integer division rounded towards zero and rounded away from zero are listed below in Table 3.

TABLE 3

EXAMPLES OF INTEGER DIVISION ROUNDED TOWARDS ZERO AND ROUNDED AWAY FROM ZERO

| Integer Division With Rounding Towards Zero (X/Y) | Integer Division With Rounding Away From Zero (X//Y) |
| --- | --- |
| 1/4 is rounded to 0 | 1//4 is rounded to 0 |
| 2/4 is rounded to 0 | 2//4 is rounded to 1 |
| 3/4 is rounded to 0 | 3//4 is rounded to 1 |
| 4/4 is rounded to 1 | 4//4 is rounded to 1 |
| 5/4 is rounded to 1 | 5//4 is rounded to 1 |
| 6/4 is rounded to 1 | 6//4 is rounded to 2 |
| 7/4 is rounded to 1 | 7//4 is rounded to 2 |
| 8/4 is rounded to 2 | 8//4 is rounded to 2 |
| −1/4 is rounded to 0 | −1//4 is rounded to 0 |
| −2/4 is rounded to 0 | −2//4 is rounded to −1 |
| −3/4 is rounded to 0 | −3//4 is rounded to −1 |
| −4/4 is rounded to −1 | −4//4 is rounded to −1 |
| −5/4 is rounded to −1 | −5//4 is rounded to −1 |
| −6/4 is rounded to −1 | −6//4 is rounded to −2 |
| −7/4 is rounded to −1 | −7//4 is rounded to −2 |
| −8/4 is rounded to −2 | −8//4 is rounded to −2 |

Therefore, in calculation intensive applications such as MPEG motion processing, it is highly desirable to round fractional intermediate results towards or away from zero in a rapid and efficient manner.

SUMMARY OF THE INVENTION

A method and apparatus in accordance with the present invention advantageously provides for right-shifting a signed or unsigned operand by N bit positions to obtain a fractional intermediate result, and then rounding the fractional intermediate result either towards or away from zero as prescribed in the MPEG standard to provide a rounded integer result. Moreover, the right-shifting and rounding can be performed in a single instruction cycle.

In an embodiment of the invention, a method of operating a circuit to right-shift an integer operand and obtain a rounded integer result includes right-shifting the operand by N bit positions, where N is an integer, to obtain a fractional intermediate result that includes integer bits and fractional bits. The right-shifting is a logical right-shift when the operand is unsigned and an arithmetic right-shift when the operand is signed. The method also includes incrementing the integer bits for providing incremented integer bits as the rounded integer result (i) when any of the fractional bits is a one and the operand is negative and signed and round towards zero is selected, (ii) when the most significant bit of the fractional bits is a one and the operand is unsigned and round away from zero is selected, (iii) when the most significant bit of the fractional bits is a one and the operand is positive and signed and round away from zero is selected, and (iv) when the most significant bit of the fractional bits is a one and any other of the fractional bits is a one and the operand is negative and signed and round away from zero is selected. Otherwise the integer bits provide the rounded integer result.

The foregoing steps are best-suited for applications where N is within a maximum shift count, such as the operand's bit length minus one. If N exceeds the maximum shift count by one, the method may include right-shifting the operand by the maximum shift count, providing the integer bits as the rounded integer result (i) when the operand unsigned and round away from zero is selected, and (ii) when all the fractional bits are zero's and the operand is negative and signed and round away from zero is selected, and otherwise providing zero as the rounded integer result. Furthermore, if N exceeds the maximum shift count by two or more, the method may include providing zero as the rounded integer result.

In another embodiment of the invention, an apparatus includes a right-shifter, a control circuit and an increment circuit. The right-shifter right-shifts the operand. The control circuit generates an increment signal in response to the sign bit of the operand, the fractional bits, a mode signal indicative of whether the operand is signed or unsigned, and a round signal that selects round towards zero or round away from zero. The increment circuit provides either the incremented integer bits or the integer bits as the rounded integer result in response to the increment signal.

If desired, the apparatus may also include a range detector for determining whether N exceeds a maximum shift count, for generating a range indicating signal that affects the control circuit when N exceeds the maximum shift count by one, and for generating an underflow signal that forces the increment circuit to set the rounded integer result to zero, regardless of the increment signal, when N exceeds the maximum shift count by two or more, and in some instances when N exceeds the maximum shift count by one.

The method or apparatus can be configured for signed operands, unsigned operands, or both, as well as for rounding towards zero, rounding away from zero, or both, and also for receiving an integer N that either does or does not contain enough bit positions to enable N to exceed a maximum shift count.

For instance, if rounding unsigned operands away from zero is desired, and N is within the maximum shift count, then the method includes incrementing the integer bits to provide the rounded integer result when the most significant bit of the fractional bits is a one, and otherwise providing the integer bits as the rounded integer result. The control circuit generates the increment signal in response to the most significant bit of the fractional bits.

Preferably, the operand consists of M bits, the fractional intermediate result consists of M integer bits and M−1 fractional bits, N is in the range of 0 to M−1, the N least significant operand bits are shifted into the N most significant fractional bits, and the M−N−1 least significant fractional bits are padded with zero's.

A feature of the invention is that the rounded integer result can be used to represent the operand divided by $2^N$ and rounded in accordance with the MPEG standard.

These and other aspects, features and advantages of the invention will be further described and more readily apparent from a review of the detailed description of the preferred embodiments which follows.

BRIEF DESCRIPTION OF THE DRAWINGS

In the drawings, which are not necessarily drawn to scale, in which like reference characters indicate like parts.

DETAILED DESCRIPTION OF THE PREFERRED EMBODIMENTS

The present invention right-shifts an integer operand to obtain a fractional intermediate result. The fractional intermediate result includes both integer bits (to the left of the binary point) and fractional bits (to the right of the binary point). The most significant bit (MSB) of the fractional bits is to the immediate right of the binary point, in the half-integer position.

In accordance with an embodiment of the invention, a rounded integer result is provided by either the integer bits, the integer bits incremented by one, or zero. The choice depends on whether the operand is signed or unsigned, the operand is positive or negative (if signed), round towards zero or round away from zero is selected, and also on the values of the fractional bits, and the value of N compared to a maximum shift count.

Preferably, the integer operand is M-bits, the rounded integer result is M-bits, the right-shifter is an M-bit M-place shifter with a maximum shift count of M−1, and the fractional intermediate result has M integer bits and M−1 fractional bits. When right-shifting occurs, the MSB of the integer bits is set to a zero (i.e., a logical right-shift) when the operand is unsigned, and set to the sign bit of the operand (i.e., an arithmetic right-shift) when the operand is signed. Furthermore, the shifted-out bits are shifted into the fractional bit positions, however any fractional bits that do not receive a shifted-out bit are padded with zero's. Thus, the number of fractional bits does not depend on the shift count. For example, if an operand is right-shifted by one bit position, then the MSB of the fractional bits is set to the LSB of the operand, and the other fractional bits are padded with zero's. It is also generally preferred that the operand be right-shifted by N bit positions, where N is an integer between 1 and M−1, although the invention is well-suited for providing the rounded integer result when N exceeds M−1.

As used herein, signed numbers are represented in 2's complement form in which positive numbers include zero. Determining whether a signed operand is positive or negative is accomplished by inspecting its MSB. For positive operands the MSB (or sign bit) is a zero, whereas for negative operands the MSB is a one. Thus, positive operands includes zero. Furthermore, incrementing refers to increasing the least significant bit (LSB) position by one.

Figure 1A:
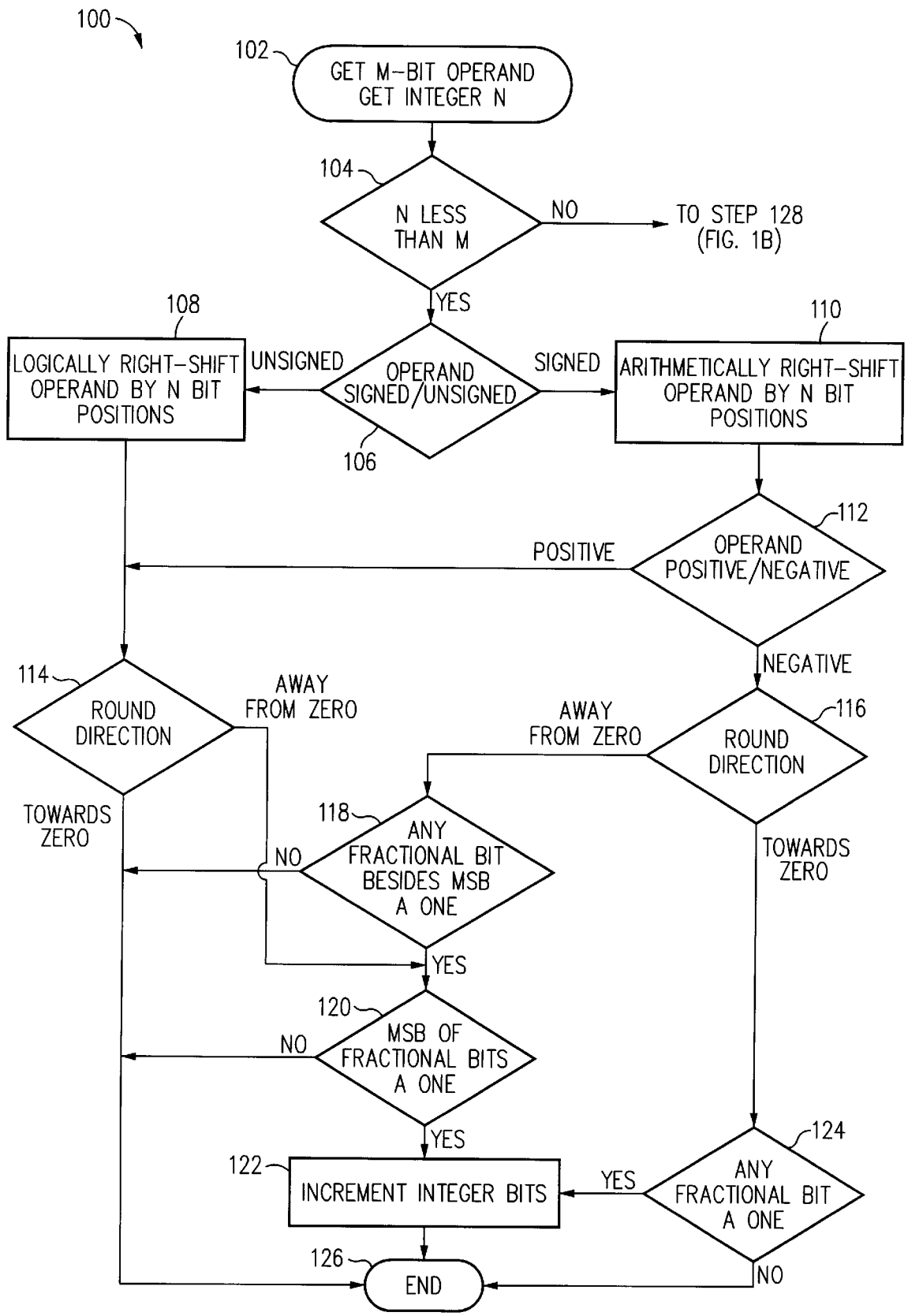
FIGS. 1A and 1B are a flow chart of an algorithm in accordance with an embodiment of the present invention.
Figure 1B:
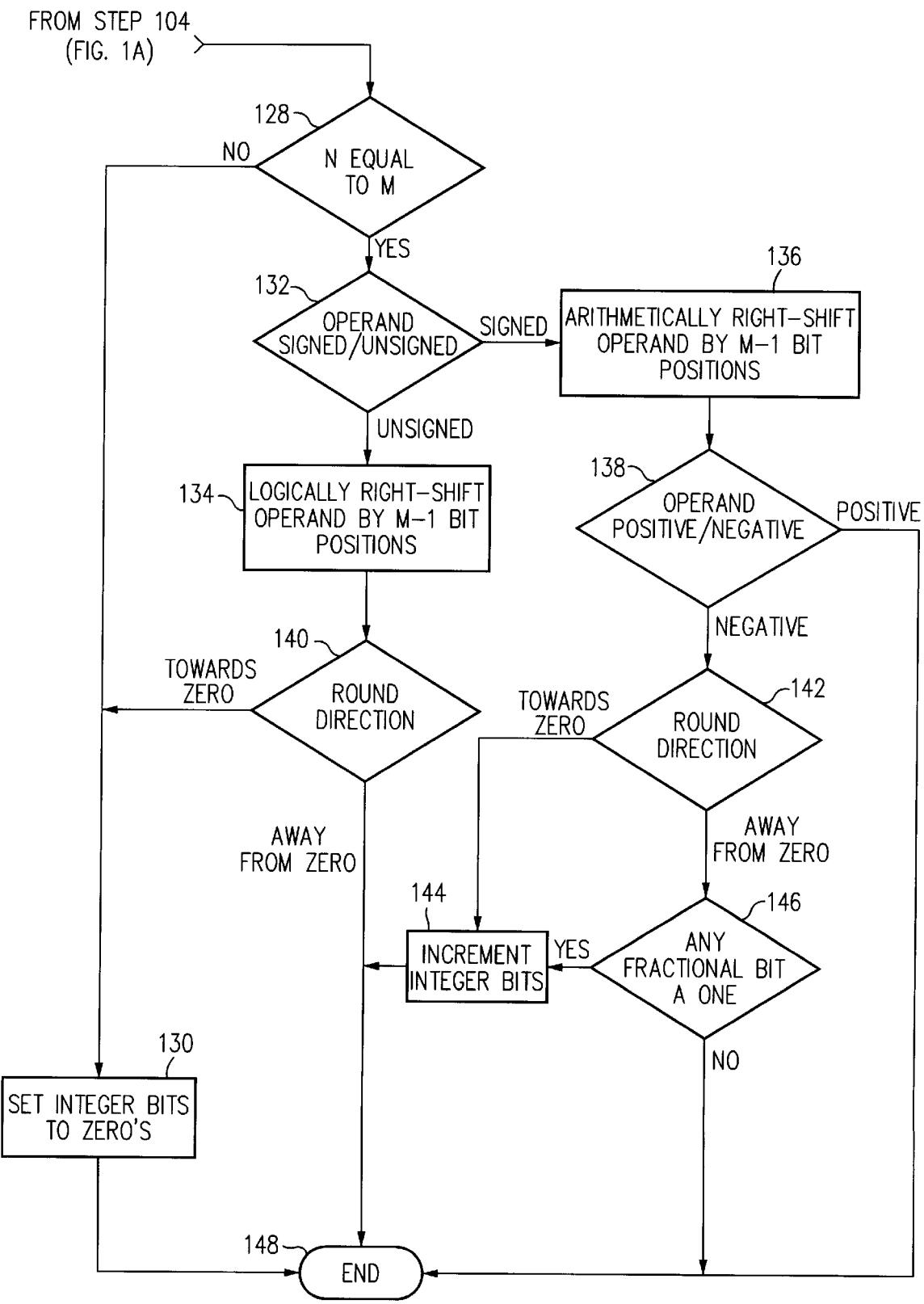

FIGS. 1A and 1B are a flow chart of algorithm 100 in accordance with an embodiment of the invention. At step 102, an M-bit integer operand and an integer N are obtained. N defines how many bit positions the operand shall be right-shifted. Decision step 104 tests whether N is less than M, thereby testing whether N is within a maximum shift count of M−1. If so, decision step 104 branches to decision step 106, if not, decision step 104 branches to decision step 128. Decision step 106 determines whether the operand is a signed or unsigned number, for instance by inspecting a mode signal. If the operand is unsigned, at step 108 the operand is logically right-shifted by N bit positions. If the operand is signed, at step 110 the operand is arithmetically right-shifted by N bit positions, and decision step 112 determines whether the signed operand is positive or negative, for instance by inspecting the MSB of the integer bits. If the signed operand is positive then decision step 112 branches to decision step 114, whereas if the signed operand is negative then decision step 112 branches to decision step 116. Also, as is seen, step 108 proceeds directly to decision step 114. Thus, if N is within the maximum shift count, algorithm 100 treats unsigned operands and positive signed operands the same except for logical right-shifting and arithmetic right-shifting, respectively.

Decision steps 114 and 116 determine the round direction, for instance by inspecting a round signal that selects round towards zero or round away from zero. At decision step 114, if round towards zero is selected, decision step 114 branches to end step 126, the integer bits provide the rounded integer result, and the algorithm terminates. Otherwise, if round away from zero is selected, decision step 114 branches to decision step 120. At decision step 120, if the MSB of the fractional bits is a one then at step 122 the integer bits are incremented, step 122 proceeds to end step 126, the incremented integer bits provide the rounded integer result, and the algorithm terminates. If, however, the MSB of the fractional bits is a zero, decision step 120 branches to end step 126, the integer bits provide the rounded integer result, and the algorithm terminates.

Returning to decision step 116, if round away from zero is selected, decision step 116 branches to decision step 118. Decision step 118 tests whether any of the fractional bits other than the MSB of the fractional bits is a one, for instance by ORing all the fractional bits except for the MSB of the fractional bits. If any of the non-MSB fractional bits is a one then decision step 118 branches to decision step 120 and the algorithm proceeds as previously described. Otherwise decision step 118 branches to end step 126, the integer bits provide the rounded integer result, and the algorithm terminates. At decision step 116, if round towards zero is selected, decision step 116 branches to decision step 124, which tests whether any of the fractional bits is a one, for instance by ORing all the fractional bits. If any of the fractional bits is a one, decision step 124 branches to increment step 122, the incremented integer bits provide the rounded integer result, and the algorithm terminates at end step 126. If, however, all the fractional bits are zero's, decision step 124 branches to end step 126, the integer bits provide the rounded integer result, and the algorithm terminates.

Returning to decision step 104, if N is greater than or equal to M (and therefore exceeds the maximum shift count)

then decision step 104 branches to decision step 128 (FIG. 1B). Decision step 128 determines whether N is equal to M. If not, and therefore N exceeds that maximum shift count by two or more, decision step 128 branches to step 130 which sets the integer bits to zero's, step 130 proceeds to end step 148, the integer bits set to zero provide the rounded integer result, and the algorithm terminates. If N is equal to M, and therefore N exceeds the maximum shift count by one, decision step 128 branches to decision step 132 which determines whether the operand is signed or unsigned. If the operand is unsigned, at step 134 the operand is logically right-shifted by M−1 bit positions. If the operand is signed, at step 136 the operand is arithmetically right-shifted by M−1 bit positions, and decision step 138 determines whether the signed operand is positive or negative. If the signed operand is positive then decision step 138 branches to end step 148, the integer bits provide the rounded integer result, and the algorithm terminates. If the signed operand is negative then decision step 138 branches to decision step 142. Also, as is seen, step 134 proceeds directly to decision step 140.

Decision steps 140 and 142 determine the round direction. At decision step 140, if round towards zero is selected, decision step 140 branches to step 130, the integer bits are set to zero's and provide the rounded integer result, and the algorithm terminates at end step 148. Otherwise, if round away from zero is selected, decision step 140 branches to end step 148, the integer bits provide the rounded integer result, and the algorithm terminates at end step 148. At decision step 142, if round towards zero is selected then at step 144 the integer bits are incremented, step 144 proceeds to end step 148, the incremented integer bits provide the rounded integer result, and the algorithm terminates. If, however, round away from zero is selected, decision step 142 branches to decision step 146 which determines whether any of the fractional bits is a one. If any fractional bit is a one, decision step 146 branches to step 144, the incremented integer bits provide the rounded integer result, and the algorithm terminates at end step 148. However, if all the fractional bits are zero's, decision step 146 branches to end step 148, the integer bits provide the rounded integer result, and the algorithm terminates at end step 148.

Variations to algorithm 100 are apparent. For instance, if N is less than M and round away from zero is selected and the MSB of the fractional bits is a zero then the integer bits provide the rounded integer result. If N is less than M and all the fractional bits are zero's then the integer bits provide the rounded integer result. If N is equal to M then the rounded integer result can be set to zero (i) when the operand is unsigned and round towards zero is selected, (ii) when the operand is positive and signed, (iii) when the operand is negative and signed and round towards zero is selected, and (iv) when the operand is negative and signed and round away from zero is selected and any fractional bit is a one. Steps 122, 124 and 126 are interchangeable with steps 144, 146 and 148, respectively.

Consider the case of unsigned operands and positive signed operands rounded towards zero when N is within the maximum shift count in more detail. In this case, the integer bits are left intact and the fractional bits are truncated. In algorithm 100, decision step 114 branches directly to end step 126, and the integer bits provide the rounded integer result.

Consider the case of unsigned operands rounded towards zero when N exceeds the maximum shift count. In this case, since N attempts to shift all the operand bits to the right of the binary point, the rounded integer result should be zero. Since, however, the operand bits are right-shifted only M−1 bit positions, the LSB of the integer bits is a one when the MSB of the operand is a one. Thus, neither the integer bits nor the incremented integer bits are suitable for the rounded integer result. In algorithm 100, decision step 140 branches to step 130 when N is equal to M, and decision step 128 branches to step 130 when N is greater than M. Therefore, the integer bits that provide the rounded integer result are all zero's.

Consider the case of positive signed operands rounded towards zero when N exceeds the maximum shift count. In this case, since N attempts to shift all the operand bits to the right of the binary point, the rounded integer result should be zero. Although the operand bits are right-shifted only M−1 bit positions, the integer bits are all zero's since the MSB of the operand is a zero. In algorithm 100, decision step 138 branches to step 148 when N is equal to M, and decision step 128 branches to step 130 when N is greater than M. Therefore, the integer bits that provide the rounded integer result are all zero's.

Consider the case of unsigned operands and positive signed operands rounded away from zero when N is within the maximum shift count in more detail. In this case, the integer bits are rounded up when the fractional value is greater than or equal to the half-integer value, and the integer bits are left intact when the fractional value is less than the half-integer value. Therefore, rounding away from zero is accomplished by incrementing the integer bits when the MSB of the fractional bits is a one. In algorithm 100, decision step 114 branches to decision step 120, the incremented integer bits provide the rounded integer result when the MSB of the fractional bits is a one, and the integer bits provide the rounded integer result when the MSB of the fractional bits is a zero.

Consider the case of unsigned operands rounded away from zero when N exceeds the maximum shift count in more detail. In this case, the only instance in which the rounded integer result should be one instead of zero is when the MSB of the operand is a one and N exceeds the maximum shift count by one. In this instance, the MSB of the operand belongs in the halfinteger position. Since, however, the operand bits are right-shifted by only M−1 bit positions, the MSB of the operand ends up as the LSB of the integer bits. Accordingly, the integer bits provide the rounded integer result when N exceeds the maximum shift count by one, otherwise the rounded integer result is zero. In algorithm 100, decision step 140 branches to step 148 when N is equal to M, and decision step 128 branches to step 130 when N is greater than M. As a result, the integer bits provide the rounded integer result, but the integer bits are forced to zero's when N is greater than M.

Consider the case of positive signed operands rounded away from zero when N exceeds the maximum shift count in more detail. In this case, since N attempts to shift all the operand bits to the right of the binary point, and the MSB of the operand is a zero, a zero belongs in the MSB of the fractional bits, and the rounded integer result should be zero. Although the operand bits are right-shifted only M−1 bit positions, the integer bits are all zero's, and therefore the integer bits provide the correct rounded integer result. In algorithm 100, decision step 138 branches to step 148 when N is equal to M, and decision step 128 branches to step 130 when N is greater than M. Therefore, the integer bits that provide the rounded integer result are all zero's.

For negative signed operands, a different rounding rule is applied. Observe that the value of an n-bit signed (2's complement) operand A is given by the expression $$-A_{n-1} \times 2^{n-1} + \sum_{i=0}^{n-2} A_{n-2-i} \times 2^{n-2-i} \qquad (1)$$

where the bits are enumerated from 0 to n−1 for any value of integer n. For example, for n=4, $$011 = (-2^{4-1} \times 0) + (2^{4-2} \times 1) + (2^{4-3} \times 1) + (2^{4-4} \times 1) = 0+4+2+1 = 7 \qquad (2)$$

$$1111 = (-2^{4-1} \times 1) + (2^{4-2} \times 1) + (2^{4-3} \times 1) + (2^{4-4} \times 1) = -8+4+2+1 = -1 \qquad (3)$$

$$1000 = (-2^{4-1} \times 1) + (2^{4-2} \times 0) + (2^{4-3} \times 0) + (2^{4-4} \times 0) = -8 + 0 + 0 = -8 \qquad (4)$$

Likewise, for n=5 with two bits to the right of the binary point, $$110.00 = (-2^{3-1} \times 1) + (2^{3-2} \times 1) + (2^{3-3} \times 0) + (2^{3-4} \times 0) + (2^{3-5} \times 0) = -4+2+0+ \\ 0+0 = -2 \qquad (5)$$

$$110.01 = (-2^{3-1} \times 1) + (2^{3-2} \times 1) + (2^{3-3} \times 0) + (2^{3-4} \times 0) + (2^{3-5} \times 1) = -4+2+0+ \\ 0+0.25 = -1.75 \qquad (6)$$

$$110.10 = (-2^{3-1} \times 1) + (2^{3-2} \times 1) + (2^{3-3} \times 0) + (2^{3-4} \times 1) + (2^{3-5} \times 0) = -4+2+0+ \\ 0.5+0 = -1.50 \qquad (7)$$

$$110.11 = (-2^{3-1} \times 1) + (2^{3-2} \times 1) + (2^{3-3} \times 0) + (2^{3-4} \times 1) + (2^{3-5} \times 1) = -4+2+0+ \\ 0.5+0.25 = -1.25 \qquad (8)$$

Hence, the MSB of a signed two's complement number, which is the sign bit, has a value or weight of $-2^{n-1}$ while the other bits all have a positive value or weight. Of importance, for negative signed operands, the fractional bits have positive value, thereby decreasing the magnitude of the operand. Likewise, incrementing the integer bits decreases the magnitude of negative signed operands.

Prior to the incrementing decision, the integer bits of a positive fractional intermediate result are either the correct integer result or too small by one (e.g., 4 should be 5). Therefore, when the fractional intermediate result is positive, incrementing the integer bits rounds up (away from zero). However, the integer bits of a negative fractional intermediate result are either the correct result or too large by one (e.g., −5 should be −4) since the fractional bits have positive value. Therefore, when the fractional intermediate result is negative, incrementing the integer bits rounds down (towards zero). As a result, when the fractional intermediate result is negative and at least one of the fractional bits is a one, the integer bits are already rounded up, and the incrementing is used to round down or offset a pre-existing round up.

Consider the case of negative signed operands rounded towards zero when N is within the maximum shift count in more detail. In this case, the integer bits are rounded down to offset a pre-existing round up when any of the fractional bits is a one, and the integer bits are left intact when all the fractional bits are zero's. Therefore, rounding is accomplished by incrementing the integer bits when any of the fractional bits is a one, and not changing the integer bits when all the fractional bits are zero's. In algorithm 100, decision step 116 branches to decision step 124. Consequently, the incremented integer bits provide the integer result when any of the fractional bits is a one, and the integer bits provide the integer result when all the fractional bits are zero's.

Consider the case of negative signed operands rounded towards zero when N exceeds the maximum shift count in more detail. In this case, since N attempts to shift all the operand bits to the right of the binary point and the MSB of the operand is a one, a one belongs in all the integer bits and the MSB of the fractional bits, the integer component (minus one) should be rounded down, and the rounded integer result should be zero. In algorithm 100, decision step 142 branches to decision step 144, and the integer bits as a string of one's are incremented and become a string of zero's when N is equal to M. Otherwise, decision step 128 branches to step 130 when N is greater than M. Therefore, the rounded integer result is zero.

Consider the case of negative signed operands rounded away from zero when N is within the maximum shift count in more detail. In this case, the integer bits are rounded to whichever integer the fractional intermediate result is closest too, and the integer bits are rounded up (towards minus infinity) when the fractional bits have the half-integer value. Therefore, rounding is accomplished by incrementing the integer bits when the MSB of the fractional bits is a one and any other of the fractional bits is a one. In algorithm 100, decision step 116 branches to decision step 118. Decision step 118 branches to decision step 120, which in turn branches to increment step 122, only if the MSB and at least one other of the fractional bits is a one. Consequently, the incremented integer bits provide the integer result when the MSB of the fractional bits and at least one other of the fractional bits is a one, and the integer bits provide the integer result when the MSB of the fractional bits is a zero or all the other fractional bits are zero's.

Consider the case of negative signed operands rounded away from zero when N exceeds the maximum shift count in more detail. In this case, since N attempts to shift all the operand bits to the right of the binary point and the MSB of the operand is a one, a one belongs in all the integer bits and the MSB of the fractional bits. The only instance in which the integer component (minus one) should not be rounded down (incremented) to zero is when the operand is the maximum negative signed integer and N exceeds the maximum shift count by one. In this instance, the fractional component has a value of 0.5, the tie case occurs, and no increment provides rounding up (towards minus infinity). Since the operand bits are right-shifted only M−1 bit positions, when the operand is the maximum negative signed integer, all the fractional bits are zero's. In algorithm 100, decision step 142 branches to decision step 146, and the integer bits are incremented unless all the fractional bits are zero's, when N is equal to M. Also, decision step 128 branches to step 130 when N is greater than M. In this manner, the integer bits provide the rounded integer result as minus one when all the fractional bits are zero's and N is equal to M, otherwise the rounded integer result is zero.

Figure 2:
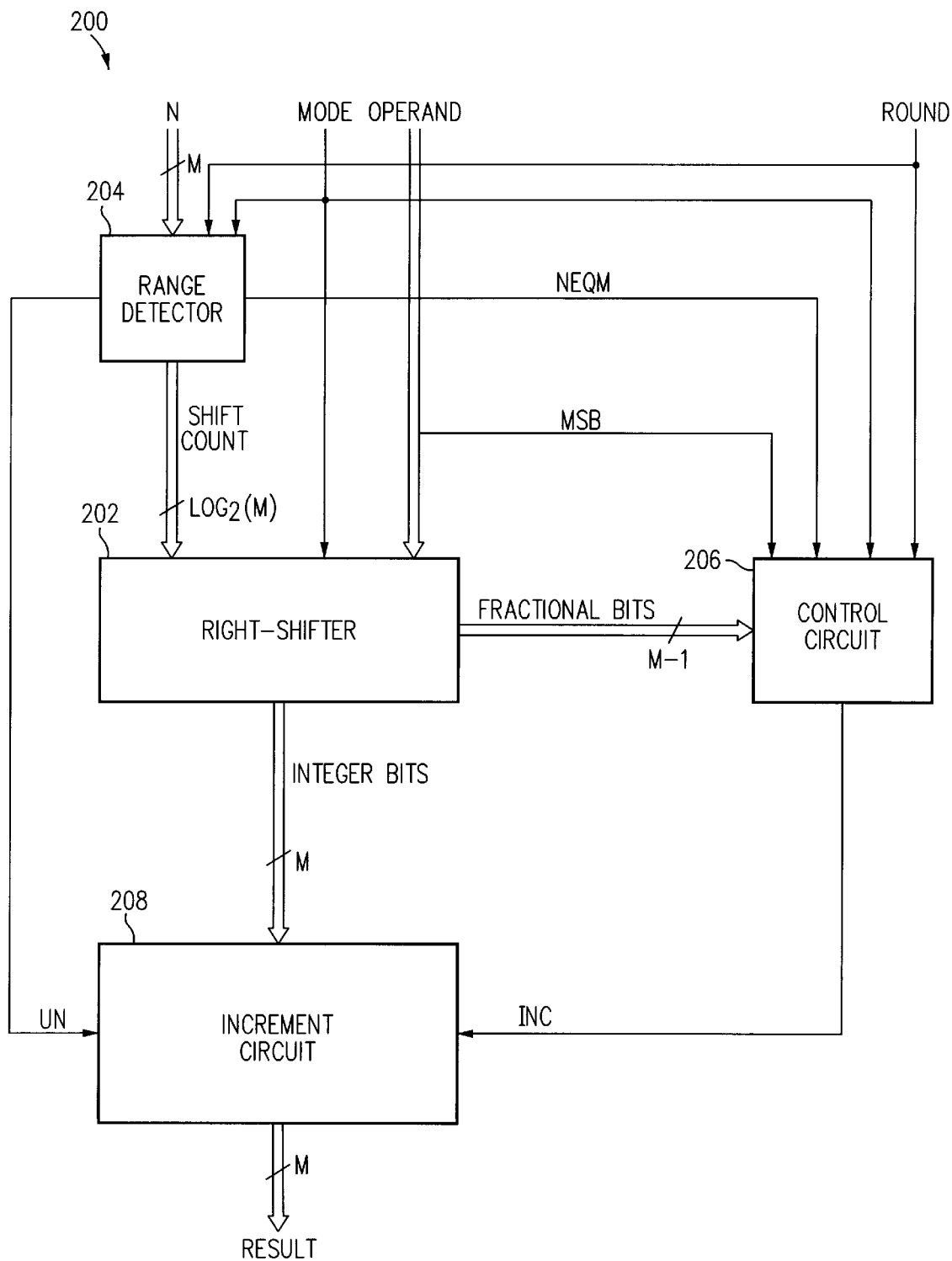
FIG. 2 is a block diagram of a logic circuit in accordance with an embodiment of the present invention.

FIG. 2 is a block diagram of logic circuit 200 for rounding an operand in accordance with an embodiment of the invention. Logic circuit 200 includes right-shifter 202, range detector 204, control circuit 206 and increment circuit 208. Right-shifter 202 is an M-bit M-place shifter that receives an M-bit binary integer operand at an operand input, a shift count signal at a shift count input, and a mode signal (MODE). The mode signal is a one for signed operands, and a zero for unsigned operands. Right-shifter 202 provides arithmetic right-shifting and inserts the sign bit of the operand (or sign-extends) at the MSB position of the operand as shifting occurs when the mode signal is a one, and right-shifter 202 provides logical right-shifting and inserts a zero at the MSB position of the shifted operand as shifting occurs when the mode signal is a zero.

Right-shifter 202 is capable of right-shifting the operand by shift lengths of 0 to M−1 bit positions as specified by the shift count signal. Therefore, right-shifter 202 accepts a shift count signal with $\log_2(M)$ bits at its shift count input. Moreover, when a right-shift occurs, right-shifter 202 provides M integer bits and M−1 fractional bits regardless of the shift count. The shifted-out bits are shifted into the fractional bit positions, but any fractional bit not receiving a shifted-out bit is padded with a zero. For example, if a positive signed operand is right-shifted by one bit position, the MSB of the integer bits is set to zero, the M−1 right-most integer bits are set to the M−1 left-most bits of the operand, the MSB of the fractional bits is set to the LSB of the operand, and the M−2 right-most fractional bits are padded with zero's. Alternatively, if a negative signed operand is right-shifted by M−1 bit positions, the integer bits are set to one's, and the fractional bits are set to the M−1 right-most bits (i.e., the magnitude bits) of the operand.

Right-shifter 202 is conventional and various implementations will be apparent to those skilled in the art. For instance, right-shifter 202 can be implemented as a one-level shifter that operates serially (bit-by-bit). Such a shifter is slow since the shift time is proportional to the shift length. Alternatively, where performance rather than cost is the main issue, right-shifter 202 can be implemented as a multi-level shifter in which parallel shifting is provided using M multiplexers. In this implementation, the shift length controls the multiplexers, and the shift time is determined by the delay through the multiplexers. Furthermore, right-shifter 202 can be a left/right shifter that includes a shift direction input, although left-shifting is not essential to the present invention.

Range detector 204 receives an unsigned operand N composed of high-order and low-order bits, the mode signal, and a round signal (ROUND). The round signal is a one when round away from zero is selected, and a zero when round towards zero is selected. The high-order bits are a string of adjacent bits that include the MSB, the low-order bits are a string of adjacent bits that include the LSB, and the least significant high-order bit is adjacent to the most significant low-order bit. Right-shifter 202 is an M-place shifter with a maximum shift count of M−1. Therefore, right-shifter 202 accepts a shift count signal with $\log_2(M)$ bits at its shift count input. Accordingly, range detector 204 generates a shift count signal of $\log_2(M)$ bits, which happen to be the low-order bits of N. Moreover, range detector 204 generates a range indicating signal (NEQM) when N equals M.

Suppose, for example, that N is a 32-bit word, the operand is a 32-bit word, and right-shifter 202 is a 32-place shifter with a maximum shift count of 31. In this instance, shift counts of 0 to 31 are within the maximum shift count, and the maximum number of bits that right-shifter 202 accepts at its shift count input is $\log_2(32)$, or 5 bits. As a result, N consists of 27 high-order bits (at bit positions $2^{31}$ to $2^5$) and 5 low-order bits (at bit positions $2^4$ to $2^0$). Range detector 204 transfers the 5 low-order bits as the shift count signal to right-shifter 202.

Range detector 204 also provides an underflow signal (UN) when N exceeds the maximum shift count of right-shifter 202 by two or more, and when N exceeds the maximum shift count of right-shifter by one and an unsigned operand is rounded towards zero. Range detector 204 can be implemented using simple combinatorial logic.

Control circuit 206 receives the fractional bits from right-shifter 202, the MSB (or sign bit) of the operand, the mode signal, the round signal, and the range indicating signal. Control circuit 206 contains combinatorial logic which generates an increment signal (INC) at a control output. The increment signal is a one when the integer bits in right-shifter 202 need to be incremented to provide the rounded integer result, and the increment signal is a zero when the integer bits in right-shifter 202 provide the rounded integer result. A truth table for control circuit 206 when the range indicating signal is a zero is listed below in Table 4.

TABLE 4

TRUTH TABLE FOR CONTROL CIRCUIT 206 WHEN THE RANGE INDICATING SIGNAL IS A ZERO

| ROUND (0 = Towards Zero) (1 = Away From Zero) | MODE (0 = Unsigned) (1 = Signed) | MSB of Operand | MSB of Fractional Bits | OR of non-MSB Fractional Bits | INC (0 = No Increment) (1 = Increment) |
|---|---|---|---|---|---|
| 0 | 0 | 0 | 0 | 0 | 0 |
| 0 | 0 | 0 | 0 | 1 | 0 |
| 0 | 0 | 0 | 1 | 0 | 0 |
| 0 | 0 | 0 | 1 | 1 | 0 |
| 0 | 0 | 1 | 0 | 0 | 0 |
| 0 | 0 | 1 | 0 | 1 | 0 |
| 0 | 0 | 1 | 1 | 0 | 0 |
| 0 | 0 | 1 | 1 | 1 | 0 |
| 0 | 1 | 0 | 0 | 0 | 0 |
| 0 | 1 | 0 | 0 | 1 | 0 |
| 0 | 1 | 0 | 1 | 0 | 0 |
| 0 | 1 | 0 | 1 | 1 | 0 |
| 0 | 1 | 1 | 0 | 0 | 0 |
| 0 | 1 | 1 | 0 | 1 | 1 |
| 0 | 1 | 1 | 1 | 0 | 1 |
| 0 | 1 | 1 | 1 | 1 | 1 |
| 1 | 0 | 0 | 0 | 0 | 0 |
| 1 | 0 | 0 | 0 | 1 | 0 |
| 1 | 0 | 0 | 1 | 0 | 1 |
| 1 | 0 | 0 | 1 | 1 | 1 |
| 1 | 0 | 1 | 0 | 0 | 0 |
| 1 | 0 | 1 | 0 | 1 | 0 |
| 1 | 0 | 1 | 1 | 0 | 1 |
| 1 | 0 | 1 | 1 | 1 | 1 |
| 1 | 1 | 0 | 0 | 0 | 0 |
| 1 | 1 | 0 | 0 | 1 | 0 |
| 1 | 1 | 0 | 1 | 0 | 1 |
| 1 | 1 | 0 | 1 | 1 | 1 |
| 1 | 1 | 1 | 0 | 0 | 0 |
| 1 | 1 | 1 | 0 | 1 | 0 |
| 1 | 1 | 1 | 1 | 0 | 0 |
| 1 | 1 | 1 | 1 | 1 | 1 |

As seen in Table 4, when the range indicating signal is a zero, control circuit 206 sets the increment signal to a one (i) when any of the fractional bits is a one and the operand is negative and signed and round towards zero is selected, (ii) when the most significant bit of the fractional bits is a one and the operand is unsigned and round away from zero is selected, (iii) when the most significant bit of the fractional bits is a one and the operand is positive and signed and round away from zero is selected, and (iv) when the most significant bit of the fractional bits is a one and any other of the fractional bits is a one and the operand is negative and signed and round away from zero is selected, and otherwise control circuit 206 sets the increment signal to a zero.

A truth table for control circuit 206 when the range indicating signal is a one is listed below in Table 5.

TABLE 5

TRUTH TABLE FOR CONTROL CIRCUIT 206 WHEN THE RANGE INDICATING SIGNAL IS A ONE

| ROUND (0 = Towards Zero) (1 = Away From Zero) | MODE (0 = Unsigned) (1 = Signed) | MSB of Operand | OR of Fractional Bits | INC (0 = No Increment) (1 = Increment) |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 0 |
| 0 | 1 | 0 | 1 | 0 |
| 0 | 1 | 1 | 0 | 1 |
| 0 | 1 | 1 | 1 | 1 |
| 1 | 0 | 0 | 0 | 0 |
| 1 | 0 | 0 | 1 | 0 |
| 1 | 0 | 1 | 0 | 0 |
| 1 | 0 | 1 | 1 | 0 |
| 1 | 1 | 0 | 0 | 0 |
| 1 | 1 | 0 | 1 | 0 |
| 1 | 1 | 1 | 0 | 0 |
| 1 | 1 | 1 | 1 | 1 |

As seen in Table 5, when the range indicating signal is a one, control circuit 206 sets the increment signal to a one (i) when the operand is negative and signed and round towards zero is selected, and (ii) when any of the fractional bits is a one and the operand is negative and signed and round away from zero is selected, and otherwise control circuit 206 sets the increment signal to a zero.

It is observed that when the range indicating signal is a one, and control circuit 206 sets the increment signal to a one, that the operand is negative and signed, and therefore the integer bits are a string of one's, the incrementing operation converts the integer bits into a string of zero's, and the rounded integer result is zero. Therefore, as an alternative arrangement, range detector 204 can be modified to set the underflow signal to a one in instances where the increment signal is a one in Table 5, such that control circuit 206 not need set the increment signal to a one in these instances.

Suppose the operand (A) includes bits $A_{MSB} \ldots A_0$, and the fractional bits (F) include bits $F_{MSB} \ldots F_0$.

For round towards zero, when N is within the maximum shift count, control circuit 206 sets the increment signal to a one when the operand is signed and negative and any of the fractional bits is a one. Accordingly, control circuit 206 implements the expression $$INC = \overline{ROUND} \cdot MODE \cdot A_{MSB} \cdot (F_{MSB} + \ldots + F_0) \quad (9)$$

For round away from zero, when N is within the maximum shift count, control circuit 206 sets the increment signal to a one when the most significant bit of the fractional bits is a one and the operand is unsigned, when the most significant bit of the fractional bits is a one and the operand is positive and signed, and when the most significant bit of the fractional bits is a one and any other of the fractional bits is a one and the operand is negative and signed. Accordingly, control circuit 206 implements the expression $$INC = ROUND \cdot ((\overline{MODE} \cdot F_{MSB}) + (MODE \cdot \overline{A}_{MSB} \cdot F_{MSB}) + (MODE \cdot A_{MSB} \cdot F_{MSB} \cdot (F_{MSB-1} + \ldots + F_0))) \quad (10)$$

Expression (10) can be simplified as follows:

$$INC = ROUND \cdot F_{MSB} \cdot (\overline{MODE} + (MODE \cdot \overline{A}_{MSB}) + (MODE \cdot A_{MSB} \cdot (F_{MSB-1} + \ldots + F_0))) \quad (11)$$

$$INC = ROUND \cdot F_{MSB} \cdot (\overline{MODE} + \overline{A}_{MSB} + (A_{MSB} \cdot (F_{MSB-1} + \ldots + F_0))) \quad (12)$$

$$INC = ROUND \cdot F_{MSB} \cdot (\overline{MODE} + \text{fheight} \overline{A}_{MSB} + F_{MSB-1} + \ldots + F_0) \quad (13)$$

Expressions (9) and (13) can be combined into the expression $$INC = (ROUND \cdot F_{MSB} \cdot (\overline{MODE} + \overline{A}_{MSB} + F_{MSB-1} + \ldots + F_0)) + (\overline{ROUND} \cdot MODE \cdot A_{MSB} \cdot (F_{MSB} + \ldots + F_0)) \quad (14)$$

For round towards zero, when N exceeds the maximum shift count by one, control circuit 206 sets the increment signal to a one when the operand is signed and negative. Accordingly, control circuit 206 implements the expression $$INC = \overline{ROUND} \cdot MODE \cdot A_{MSB} \quad (15)$$

For round away from zero, when N exceeds the maximum shift count by one, control circuit 206 sets the increment signal to a one when the operand is signed and negative and any of the fractional bits is a one. Accordingly, control circuit 206 implements the expression $$INC = ROUND \cdot MODE \cdot A_{MSB} \cdot (F_{MSB} + \ldots + F_0) \quad (16)$$

Expressions (15) and (16) can be combined into the expression $$INC = MODE \cdot A_{MSB} \cdot (\overline{ROUND} + F_{MSB} + \ldots + F_0) \quad (17)$$

Finally, for round towards zero and round away from zero, both when N is within the maximum shift count and N exceeds the maximum shift count by one, expressions (14) and (17) can be combined into the expression $$INC = \overline{NEQM} \cdot ((ROUND \cdot F_{MSB} \cdot (\overline{MODE} + \overline{A}_{MSB} + F_{MSB-1} + \ldots + F_0)) + (\overline{ROUND} \cdot MODE \cdot A_{MSB} \cdot (F_{MSB} + \ldots + F_0))) + NEQM \cdot MODE \cdot A_{MSB} \cdot (\overline{ROUND} + F_{MSB} + \ldots + F_0) \quad (18)$$

Increment circuit 208 receives the integer bits at an operand input, increments the integer bits to provide the incremented integer bits as the rounded integer result when the increment signal is a one, and provides the integer bits (non-incremented) as the rounded integer result when the increment signal is a zero. Furthermore, increment circuit 208 provides the rounded integer result as all zero's when the underflow signal (UN) generated by range detector 204 is a one. In effect, the underflow signal forces the rounded integer result to zero, regardless of the integer bits and the increment signal.

FIGS. 3–6 are block diagrams of increment circuits suitable for use in the logic circuit of FIG. 2.

Figure 3:
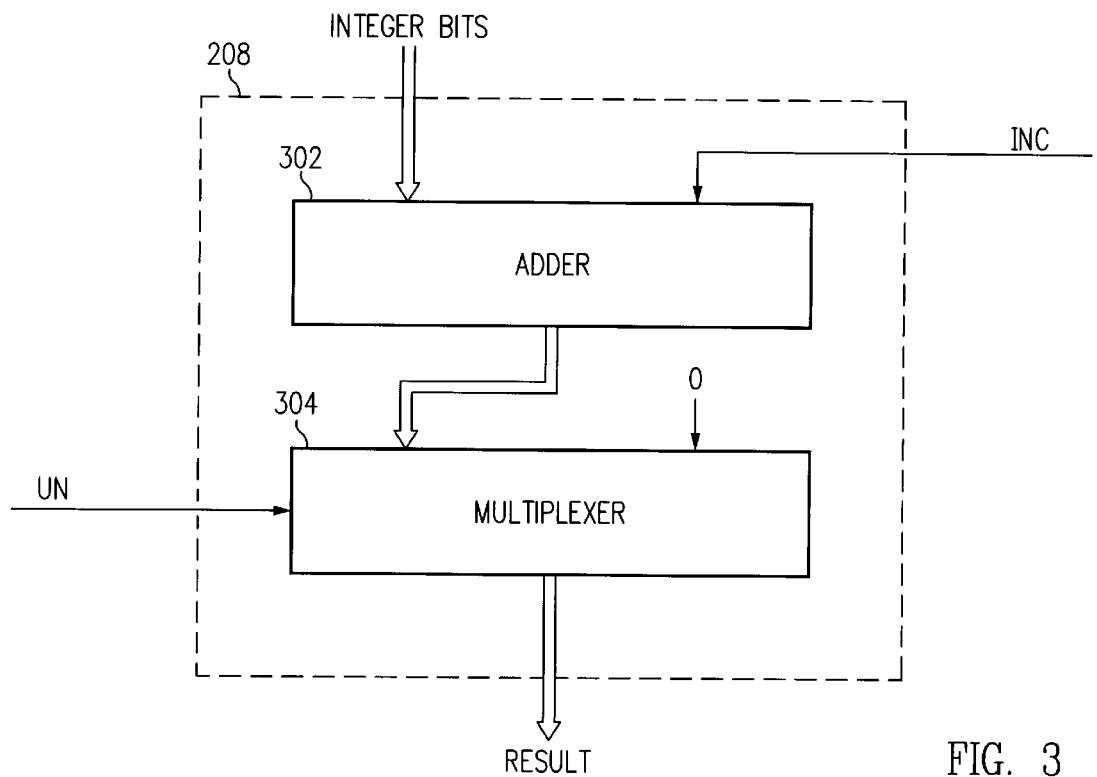
FIGS. 3–6 are block diagrams of increment circuits suitable for use in the logic circuit of FIG. 2.

In FIG. 3, increment circuit 208 is implemented by adder 302 and multiplexer 304. Adder 302 receives the integer bits at a first operand input, and the increment signal at a second operand input. Adder 302 couples the sum of the integer bits and the increment signal to a first operand input of multiplexer 304, and zero is coupled to a second operand input of multiplexer 304. Multiplexer 304 is a conventional 2:1 multiplexer. When the underflow signal is a zero, multiplexer 304 selects the first operand input and provides the output of adder 302 as the result. When the underflow signal is a one, multiplexer 304 selects the second operand input and provides zero as the result.

Figure 4:
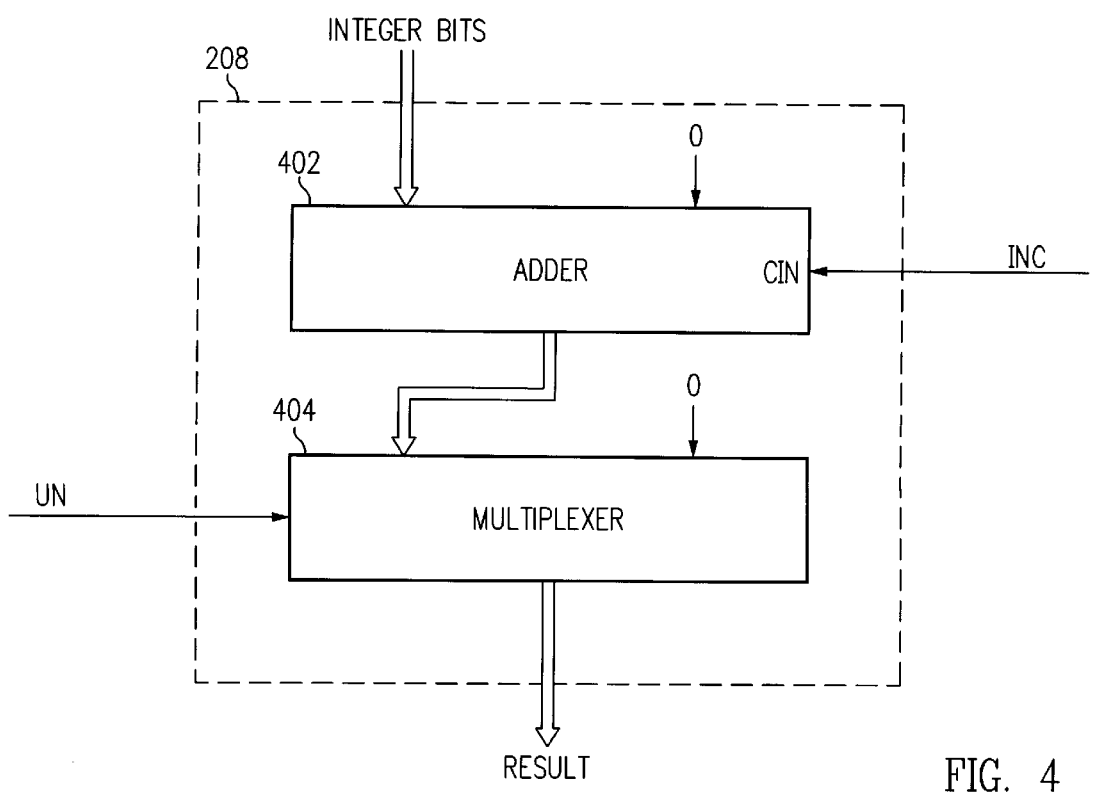

In FIG. 4, increment circuit 208 is implemented by adder 402 and multiplexer 404. Adder 402 receives the integer bits at a first operand input and a zero at a second operand input. Adder 402 also receives the increment signal as a carry-in bit at the LSB position. Adder 402 couples the sum of the integer bits and the increment signal to a first operand input of multiplexer 404, and zero is coupled to a second operand input of multiplexer 404. Multiplexer 404 is a conventional 2:1 multiplexer. When underflow signal is a zero, multiplexer 404 selects the first operand input and provides the output of adder 402 as the result. When the underflow signal is a one, multiplexer 404 selects the second operand input and provides zero as the result.

Figure 5:
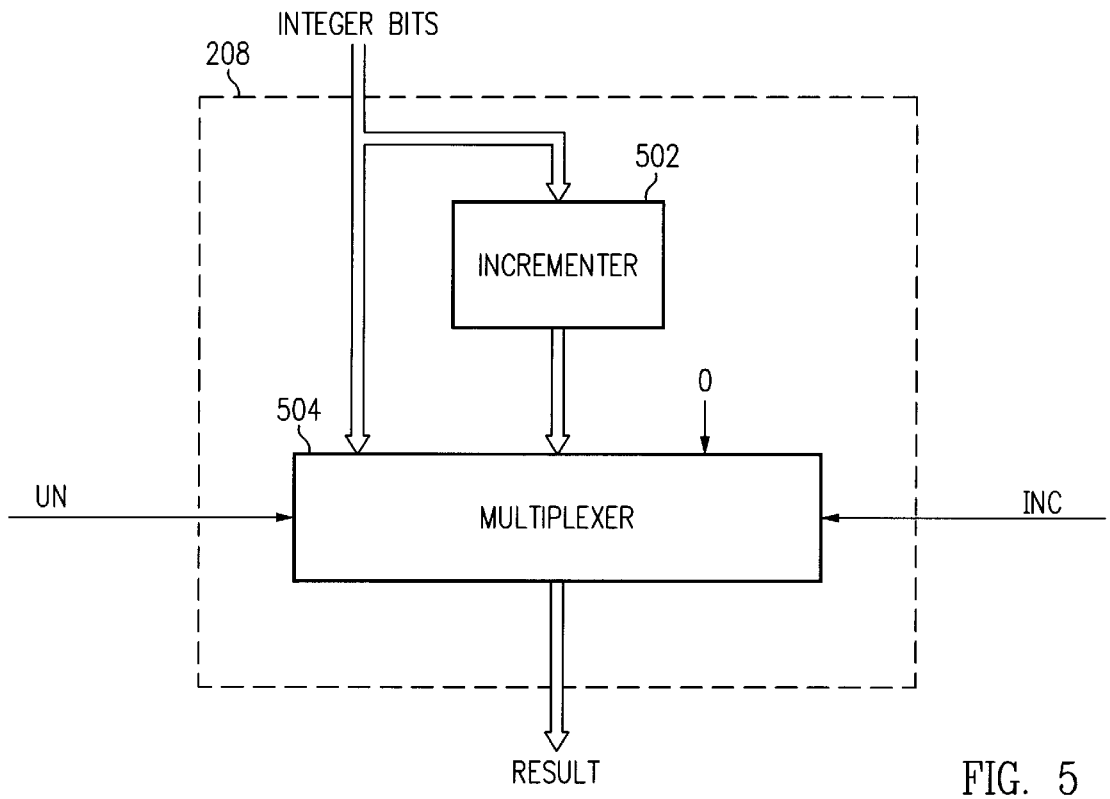

In FIG. 5, increment circuit 208 is implemented by incrementer 502 and multiplexer 504. Incrementer 502 receives the integer bits at a first operand input and couples incremented integer bits to a first operand input of multiplexer 504. The integer bits are coupled to a second operand input of multiplexer 504, and zero is coupled to a third operand input of multiplexer 504. Multiplexer 504 is a conventional 3:1 multiplexer. When the increment signal is a one and the underflow signal is a zero, multiplexer 504 selects the first operand input and provides the incremented integer bits as the result. When the increment signal is a zero and the underflow signal is a zero, multiplexer 504 selects the second operand input and provides the integer bits as the result. Finally, when the underflow signal is a one, multiplexer 504 selects the third operand input and provides zero as the result (regardless of the increment signal).

Figure 6:
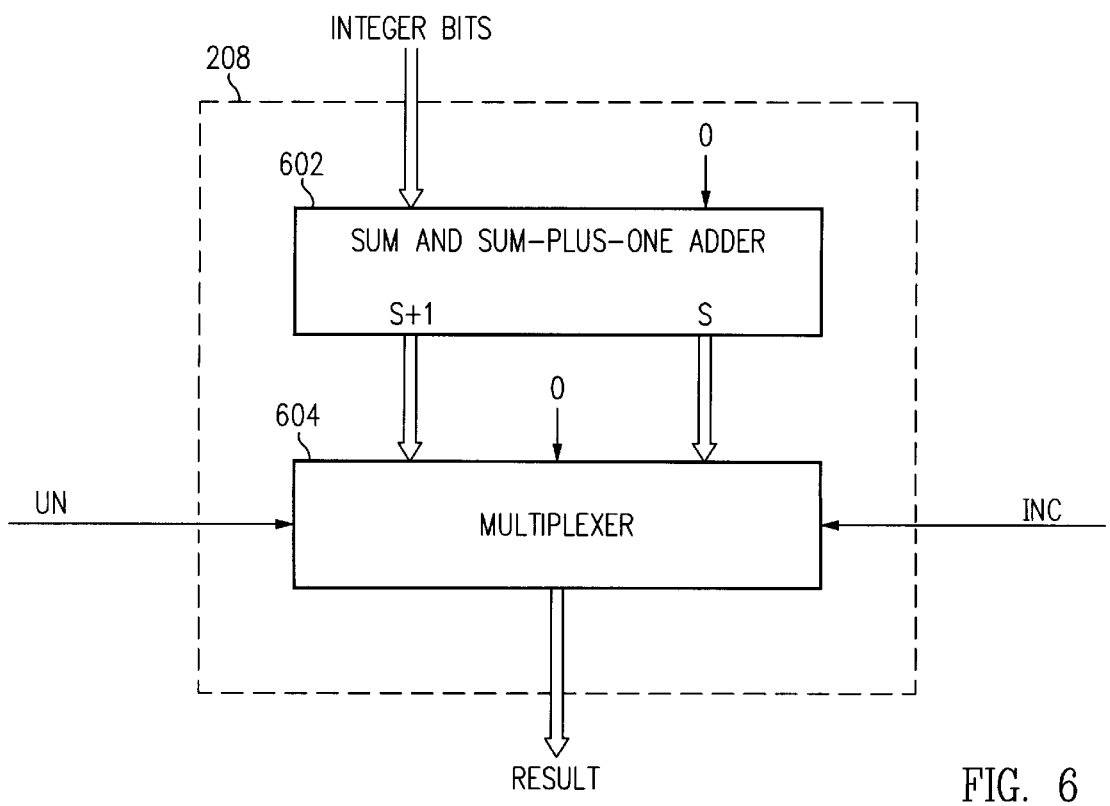

In FIG. 6, increment circuit 208 is implemented by sum and sum-plus-one adder 602 and multiplexer 604. Adder 602 receives the integer bits at a first operand input and zero at a second operand input. Adder 602 generates a sum-plus-one of the operands at a sum-plus-one output (S+1), and a sum of the operands at sum output (S). Accordingly, adder 602 provides the incremented integer bits at the sum-plus-one output which is coupled to a first operand input of multiplexer 604, and adder 602 provides the integer bits at the sum output which is coupled to a second operand input of multiplexer 604. Zero is coupled to a third operand input of multiplexer 604. Multiplexer 604 is a conventional 3:1 multiplexer. When the increment signal is a one and the underflow signal is a zero, multiplexer 604 selects the first operand input and provides the incremented integer bits as the result. When the increment signal is a zero and the underflow signal is a zero, multiplexer 604 selects the second operand input and provides the integer bits as the result. Finally, when the underflow signal is a one, multiplexer 604 selects the third operand input and provides zero as the result (regardless of the increment signal).

FIGS. 7A–7D are a circuit diagram of logic circuit 700 for implementing a 4-bit version of logic circuit 200. In logic circuit 700, the operand A consists of bits $A_3, A_2, A_1$ and $A_0$, the integer N consists of bits $N_3, N_2, N_1$, and $N_0$, the integer bits consist of bits $I_3, I_2, I_1$ and $I_0$, the fractional bits consist of bits $F_2, F_1$ and $F_0$, and the result consists of bits $R_3, R_2, R_1$ and $R_0$.

Figure 7A:
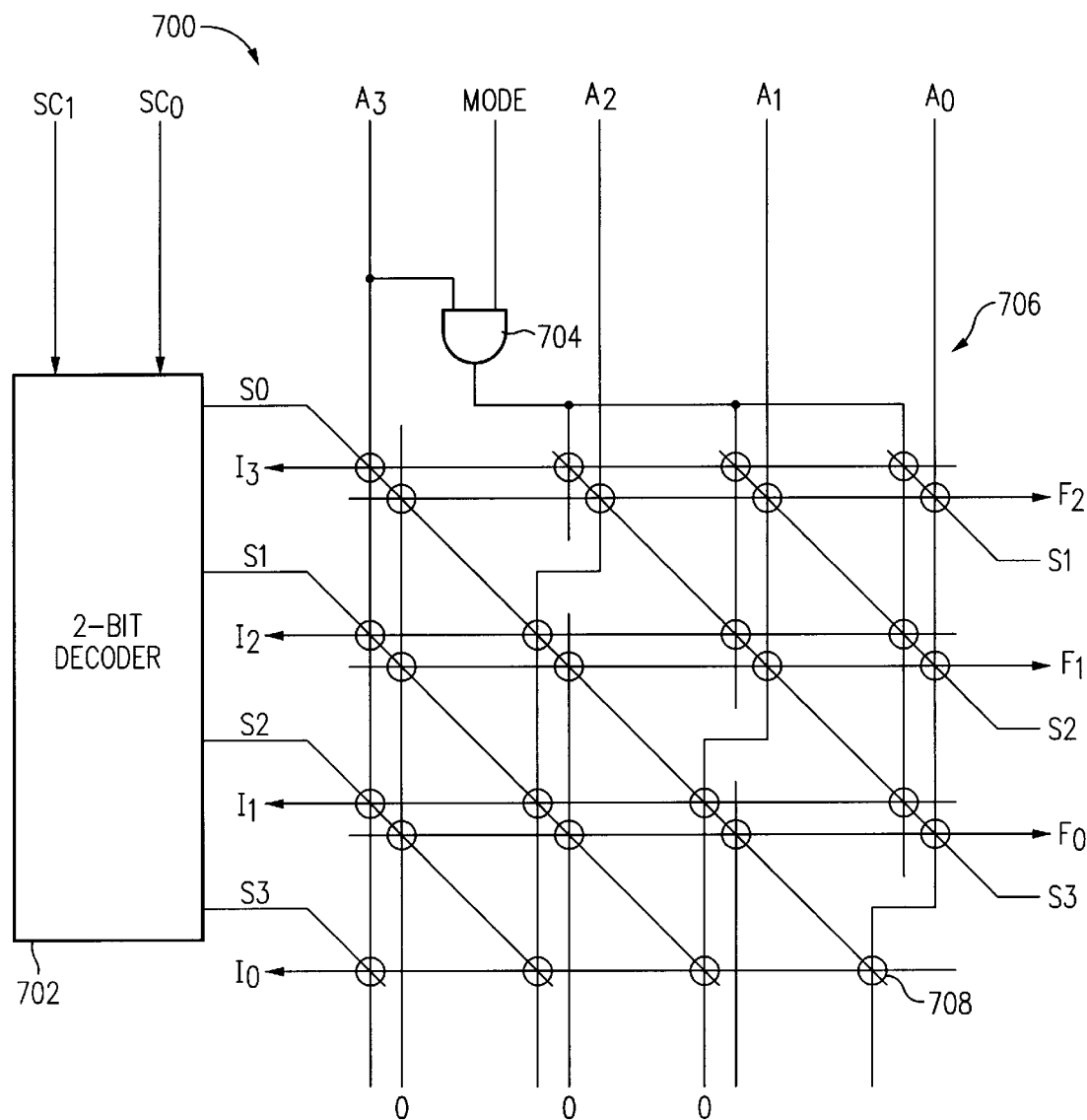
FIGS. 7A–7D are a circuit diagram of a logic circuit for implementing the logic circuit of FIG. 2.

In FIG. 7A, right-shifter 202 is a 4-bit 4-place shifter implemented with 2-bit decoder 702, AND gate 704, and shifter 706. Decoder 702 receives shift count bits $SC_1$ and $SC_0$, generates shift count signals S0, S1, S2 and S3. The truth table for decoder 702 is listed below in Table 6.

TABLE 6

TRUTH TABLE FOR DECODER 702

| $SC_1$ | $SC_0$ | Shift Signal | Shift Count |
|---|---|---|---|
| 0 | 0 | S0 | 0 |
| 0 | 1 | S1 | 1 |

TABLE 6-continued

TRUTH TABLE FOR DECODER 702

| $SC_1$ | $SC_0$ | Shift Signal | Shift Count |
|---|---|---|---|
| 1 | 0 | S2 | 2 |
| 1 | 1 | S3 | 3 |

That is, when bits $SC_1$ and $SC_0$ are zero's then signal S0 is a one and signals S1, S2 and S3 are zero's, etc. Signal S3 instructs shifter 706 to shift-right by 3 bit positions, signal S2 instructs shifter 706 to shift-right by 2 bit positions, signal S1 instructs shifter 706 to shift-right by one bit position, and signal S0 instructs shifter 706 not to shift.

AND gate 704 receives bit $A_3$ and the mode signal. Thus, AND gate 704 generates a zero when A is unsigned, generates a zero when A is positive and signed, and generates a one when A is negative and signed.

Shifter 706 is a 4-bit, 4-place right-shifter that shifts between 0 to 3 bit positions. Shifter 706 includes vertical lines that receive operand bits $A_3, A_2, A_1$ and $A_0$, vertical lines that receive the output of AND gate 704, vertical lines set to zero, diagonal lines that receive shift signals S3, S2, S1 and S0, horizontal lines that provide integer bits $I_3, I_2, I_1$ and $I_0$, and horizontal lines that provide fractional bits $F_2, F_1$ and $F_0$. Connection nodes represented by circles are disposed at selected intersections of the horizontal, vertical, and diagonal lines. At each connection node, the intersecting horizontal and vertical lines are electrically coupled to one another when the intersecting diagonal line is set to a one, and the intersecting horizontal and vertical lines are electrically isolated from one another when the intersecting diagonal line is set to a zero. For instance, connection node 708 is disposed at the intersection of the horizontal line for bit $I_0$, the vertical line for bit $A_0$ and the diagonal line for signal S0. When Signal S0 is a one, bit $A_0$ is transferred (or shifted) to bit $I_0$. When signal S0 is a zero, bit $A_0$ has no effect on bit $I_0$.

Figure 8:
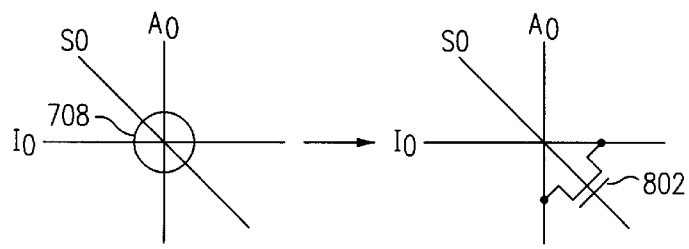
FIG. 8 is an illustration of a connection node in FIG. 7A.

In FIG. 8, connection node 708 is illustrated in more detail. As is seen, connection node 708 includes MOSFET 802 with a source coupled to the vertical line for bit $A_0$, a drain coupled to the horizontal line for bit $I_0$, and a gate coupled to the diagonal line for signal S0. When signal S0 is a one, MOSFET 802 turns on and couples the horizontal and vertical lines. When signal S0 is a zero, MOSFET 802 turns off and decouples the horizontal and vertical lines.

Returning to FIG. 7A, the integer bits and the fractional bits depend on the operand bits, the shift count bits, and the mode signal. For example, when signal S0 is a one and signals S1, S2 and S3 are zero's, then bits $I_3, I_2, I_1$ and $I_0$ are set to bits $A_3, A_2, A_1$ and $A_0$, respectively, and bits $F_2, F_1$ and $F_0$ are padded with zero's. As another example, when signal S2 is a one and signals S0, S1 and S3 are zero's and the mode signal is a one, then bits $I_3, I_2, I_1$ and $I_0$ are set to bits $A_3, A_3, A_3$ and $A_2$, respectively, and bits $F_2, F_1$ and $F_0$ are set to bits $A_2$ and $A_1$ and a zero, respectively. The truth table for shifter 706 is listed below in Table 7.

TABLE 7

TRUTH TABLE FOR SHIFTER 706

| MODE | Shift Signal | Integer Bits | | | | Fractional Bits | | |
|---|---|---|---|---|---|---|---|---|
| | | $I_3$ | $I_2$ | $I_1$ | $I_0$ | $F_2$ | $F_1$ | $F_0$ |
| 0 | S0 | $A_3$ | $A_2$ | $A_1$ | $A_0$ | 0 | 0 | 0 |
| 0 | S1 | 0 | $A_3$ | $A_2$ | $A_1$ | $A_0$ | 0 | 0 |
| 0 | S2 | 0 | 0 | $A_3$ | $A_2$ | $A_1$ | $A_0$ | 0 |
| 0 | S3 | 0 | 0 | 0 | $A_3$ | $A_2$ | $A_1$ | $A_0$ |
| 1 | S0 | $A_3$ | $A_2$ | $A_1$ | $A_0$ | 0 | 0 | 0 |
| 1 | S1 | $A_3$ | $A_3$ | $A_2$ | $A_1$ | $A_0$ | 0 | 0 |
| 1 | S2 | $A_3$ | $A_3$ | $A_3$ | $A_2$ | $A_1$ | $A_0$ | 0 |
| 1 | S3 | $A_3$ | $A_3$ | $A_3$ | $A_3$ | $A_2$ | $A_1$ | $A_0$ |

Figure 7B:
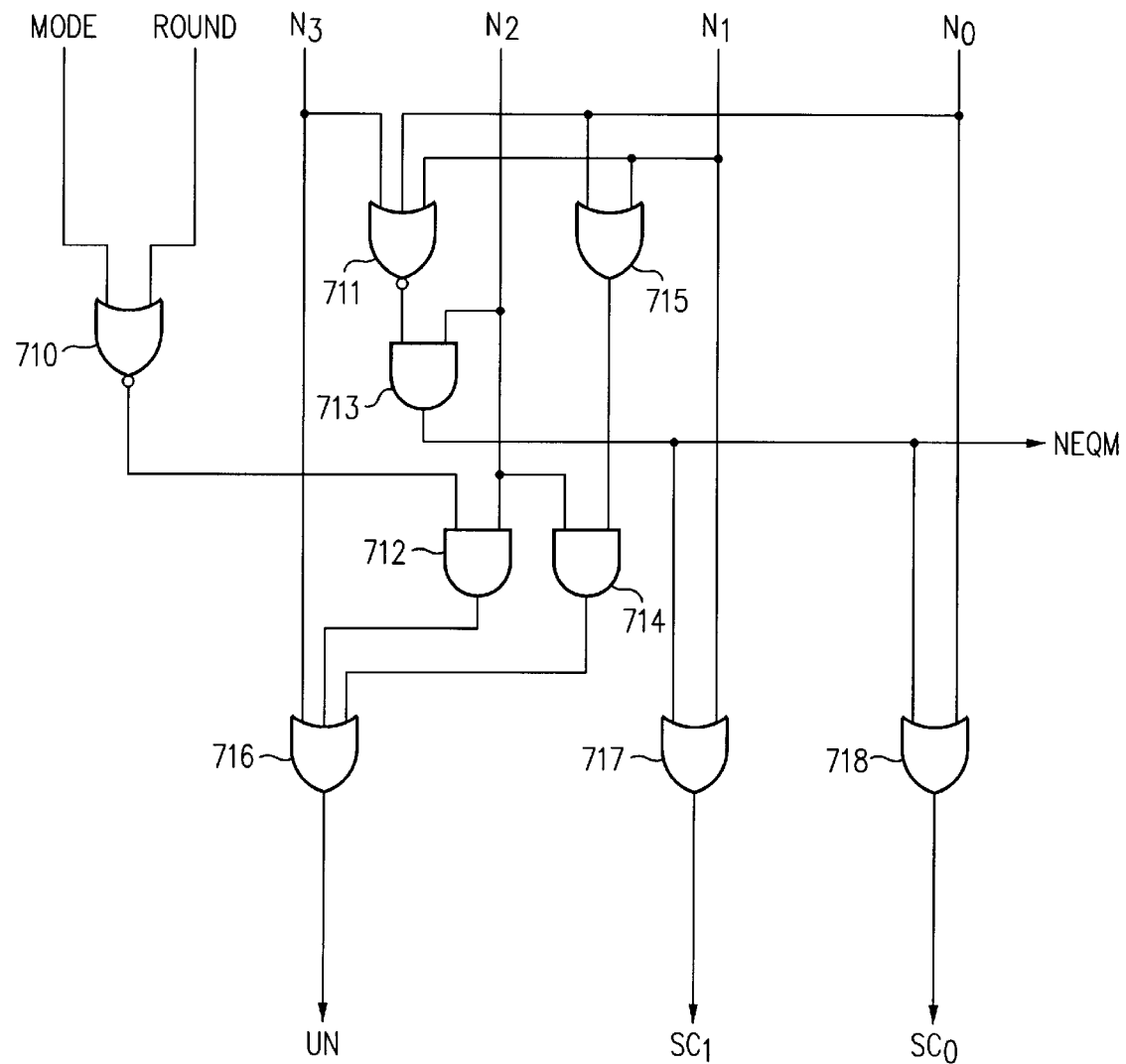

In FIG. 7B, range detector 204 is implemented using NOR gates 710 and 711, AND gates 712, 713 and OR gates 715, 716, 717 and 718. When N is in the range of zero to three, and therefore within the maximum shift count, high-order bits $N_3$ and $N_2$ are zero's, OR gates 717 and 718 transfer low-order bits $N_1$ and $N_0$ as shift count bits $SC_1$ and $SC_0$, respectively, and the underflow signal (UN) and range indicating signal (NEQM) are set to zero. When N is four, and therefore exceeds the maximum shift count by one, high order bit $N_2$ is a one, shift count bits $SC_1$ and $SC_0$ are set to one's, the range indicating signal is set to a one, and if both the mode and round signals are zero's (indicating an unsigned operand is rounded towards zero) then OR gate 716 sets the underflow signal to a one. When N is five or more, and therefore exceeds that maximum shift count by two or more, OR gate 716 sets the underflow signal to a one, and the values of bits $SC_1$ and $SC_0$ and the range indicating signal become irrelevant. If desired, NOR gate 711 and AND gate 713 can be omitted since bit $N_2$ provides an accurate range indicating signal when N is less than five.

Figure 7C:
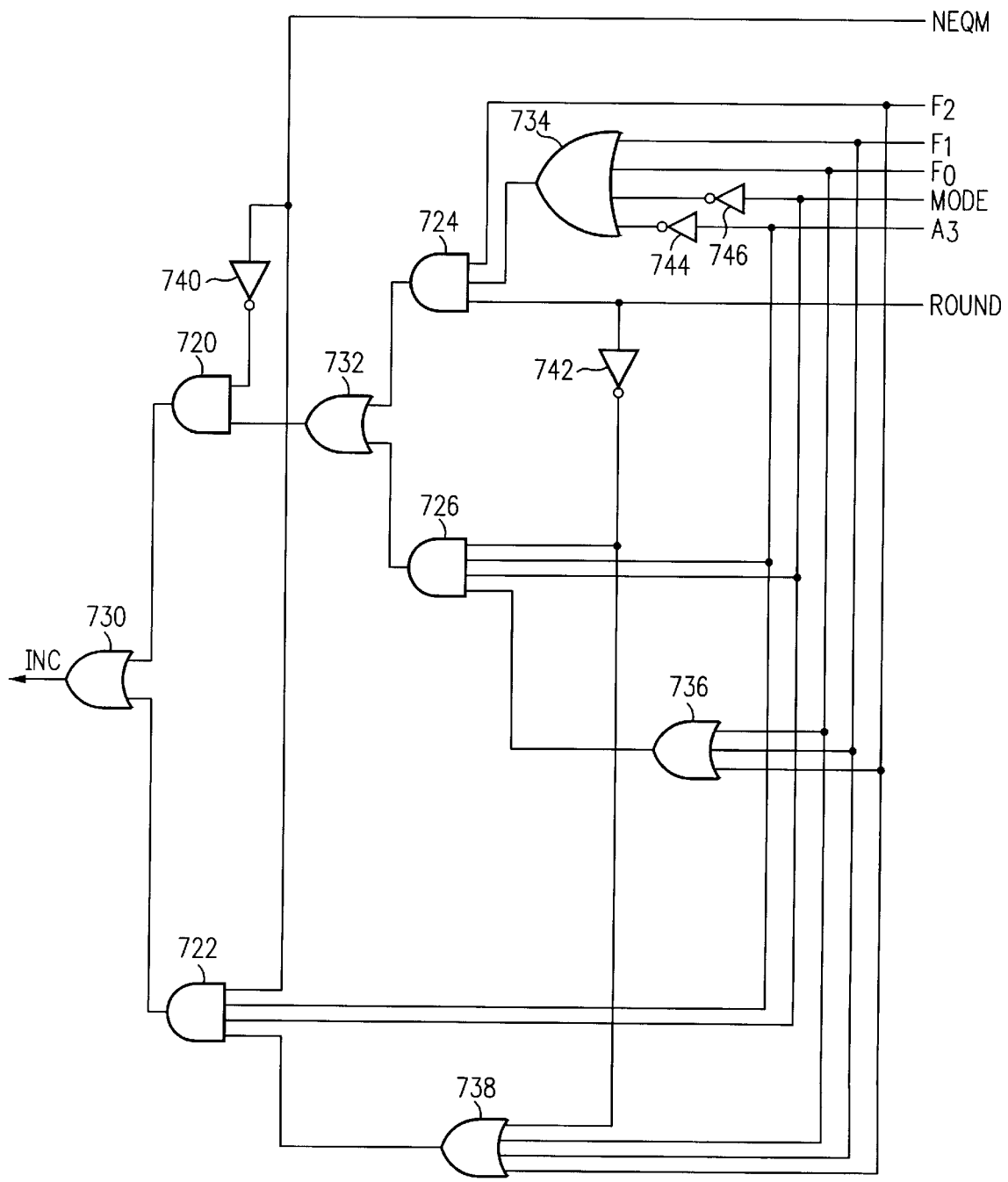

In FIG. 7C, control circuit 206 is implemented using AND gates 720, 722, 724 and 726, OR gates 730, 732, 734, 736 and 738, and inverters 740, 742, 744 and 746. In accordance with expression (18), OR gate 730 generates the increment signal as follows:

$$INC = \overline{NEQM} \cdot ((ROUND \cdot F_2 \cdot (\overline{MODE} + \overline{A_3} + F_1 + F_0)) + (\overline{ROUND} \cdot MODE \cdot A_3 \cdot (F_2 + F_1 + F_0))) + NEQM \cdot MODE \cdot A_3 \cdot (\overline{ROUND} + F_2 + F_1 + F_0) \quad (19)$$

Figure 7D:
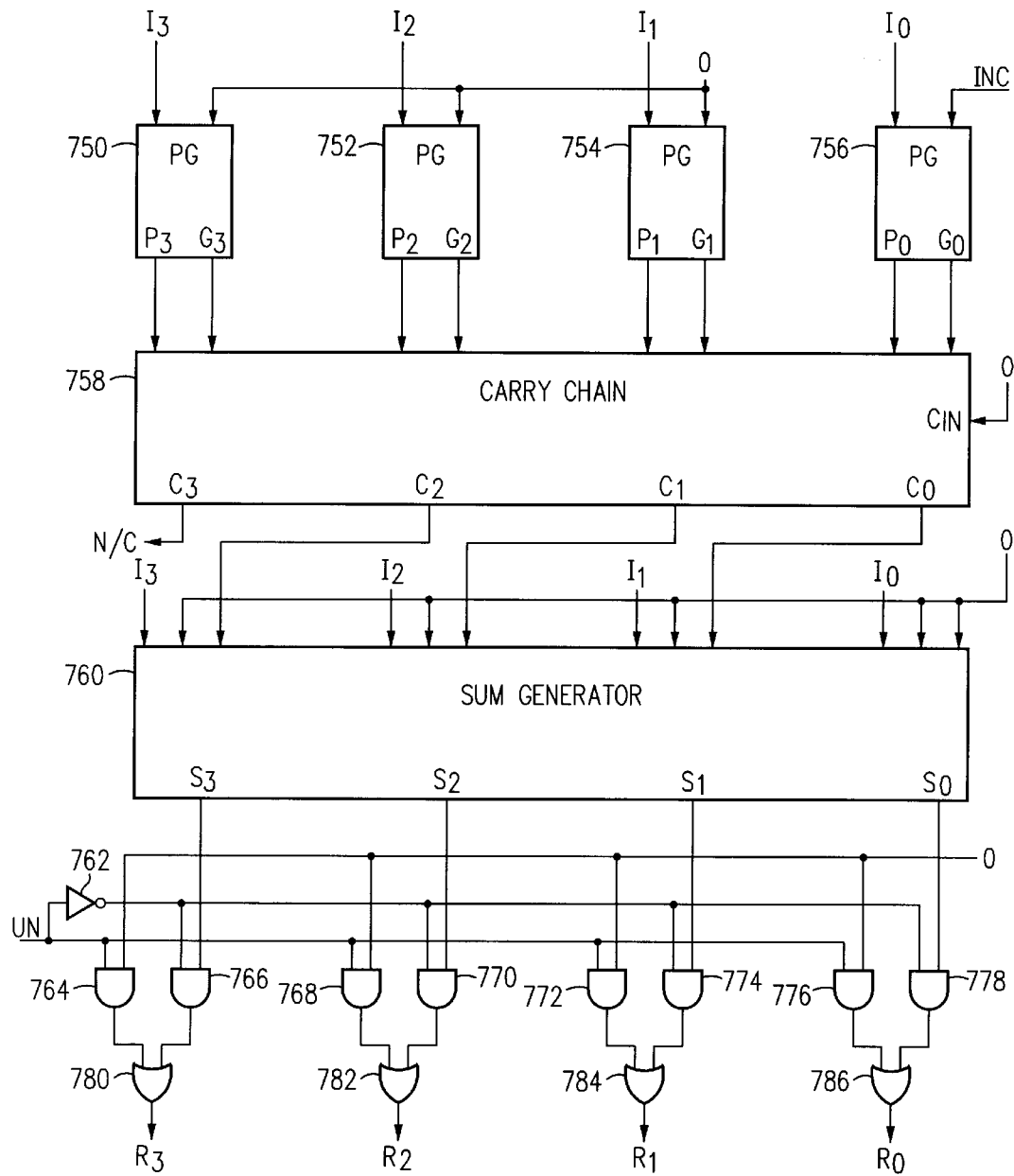

In FIG. 7D, increment circuit 208 includes an adder (similar to adder 302) and a multiplexer (similar to multiplexer 304). The adder includes propagate-generate (PG) sections 750, 752, 754 and 756, carry chain 758, and sum generator 760, and is configured to perform fast addition within the basic step time of an instruction cycle. Integer bits $I_3$, $I_2$, $I_1$ and $I_0$ are applied to first operand inputs of PG sections 750, 752, 754 and 756, respectively. In addition, a zero is applied to second operand inputs of PG sections 750, 752 and 754, and the increment signal is applied to the second operand input of PG section 756. PG section 750 provides propagate and generate signals $P_3$ and $G_3$ to stage 3 of carry chain 758, PG section 752 provides propagate and generate signals $P_2$ and $G_2$ to stage 2 of carry chain 758, PG section 754 provides propagate and generate signals $P_1$ and $G_1$ to stage 1 of carry chain 758, and PG section 756 provides propagate and generate signals $P_0$ and $G_0$ to stage 0 of carry chain 758. A zero is provided as the carry-in bit at the LSB position of carry chain 758. Carry chain 758 generates carry-out bits $C_3$, $C_2$, $C_1$ and $C_0$. Bits $I_3$ and $C_2$ and a zero are applied to stage 3 of sum generator 760, bits $I_2$ and $C_1$ and a zero are applied to stage 2 of sum generator 760, bits $I_1$ and $C_0$ and a zero are applied to stage 1 of sum generator 760, and bit $I_0$ and a pair of zero's are applied to stage 0 of sum generator 760. Sum generator 760 provides the sum of the integer bits and the increment signal as sum output bits $S_3$, $S_2$, $S_1$ and $S_0$.

Each stage of sum generator 760 may include, for instance, first and second two-input exclusive-or gates (not shown), with the inputs of the first exclusive-or gate and the second input of the second exclusive-or gate receiving the numbers to be summned, the output of the first exclusive-or gate coupled to the first input of the second exclusive-or gate, and the output of the second exclusive-or gate providing the result. Suitable PG sections, carry chains and sum generators are well-known in the art.

The multiplexer is provided by inverter 762, AND gates 764, 766, 768, 770, 772, 774, 776 and 778, and OR gates 780, 782, 784 and 786. A zero is applied to AND gates 764, 768, 772 and 776, and bits $S_3$, $S_2$, $S_1$ and $S_0$ are applied to AND gates 766, 770, 774 and 778, respectively. In addition, the underflow signal is applied to AND gates 764, 768, 772 and 776, and the bit-complement of the underflow signal is applied to AND gates 766, 770, 774 and 778. The outputs of AND gates 764 and 766 are applied to OR gate 780 which provides bit $R_3$, the outputs of AND gates 768 and 770 are applied to OR gate 782 which provides bit $R_2$, the outputs of AND gates 772 and 774 are applied to OR gate 784 which provides bit $R_1$, and the outputs of AND gates 776 and 778 are applied to OR gate 786 which provides bit $R_0$. Thus, bits $R_3$, $R_2$, $R_1$ and $R_0$ are set to bits $S_3$, $S_2$, $S_1$ and $S_0$, respectively, when the underflow signal is a zero, and bits $R_3$, $R_2$, $R_1$ and $R_0$ are set to zero's when the underflow signal is a one.

It is understood that coupling a signal to an input, such that the input responds to the signal, includes applying the signal to the input as well as applying a related signal to the input as long as functionality is preserved. For instance, coupling the increment signal to the increment circuit includes coupling the increment signal to a multiplexer that selects the incremented integer bits or the integer bits in response to a one and zero, respectively, as well as applying the bit-complement of the increment signal to a multiplexer that selects the incremented integer bits or the integer bits in response to a zero and one, respectively.

It is also understood that left-shifting refers to shifting towards the MSB position, and right-shifting refers to shifting towards the LSB position.

It is further understood that various bits can be stored in registers. For instance, a register can be disposed between right-shifter 202 and increment circuit 208 to store the integer bits. In this manner, the integer bits and the fractional bits can be provided during a first instruction cycle, and the rounded integer result can be provided during a second instruction cycle.

The shifter can implement multiplication and/or division. See, for instance, U.S. application Ser. No. 08/731,654, filed concurrently herewith, entitled "Arithmetic Shifter that Performs Multiply/Divide by $2^N$ for Positive and Negative N" by R. Wong, which is incorporated herein by reference. Furthermore, various overflow and clamping techniques can be used with the present invention in the event the operand is left-shifted. See, for instance, U.S. application Ser. No. 08/731,655, filed concurrently herewith, entitled "Left-Shifting an Integer Operand and Providing a Clamped Integer Result" by R. Wong, which is incorporated herein by reference.

The description of the invention set forth herein is illustrative, and is not intended to limit the scope of the invention as set forth in the following claims. For example, right-shifter 202, range detector 204, control circuit 206 and increment circuit 208 may be implemented in any suitable circuitry. A general purpose computer or processor can execute the invention in a single instruction cycle (as is preferred) or multiple instruction cycles. The invention is well-suited for many applications besides MPEG motion processing. Variations and modifications of the embodiments disclosed herein may be made based on the description set forth herein, without departing from the scope and spirit of the invention as set forth in the following claims.

What is claimed is:

1. A method of operating a circuit to right-shift a signed integer operand in response to an integer N and obtain an integer result rounded towards zero, comprising:

arithmetically right-shifting the operand by N bit positions using a right-shifter to obtain a fractional intermediate result that includes integer bits and fractional bits when N is within a maximum shift count of the right-shifter;

arithmetically right-shifting the operand by the maximum shift count using the right-shifter to obtain the fractional intermediate result when N is greater than the maximum shift count;

incrementing the integer bits for providing incremented integer bits as the integer result when any of the fractional bits is a one and the operand is negative, and otherwise providing the integer bits as the integer result when N is within the maximum shift count; and providing the integer result when N is greater than the maximum shift count.

2. The method of claim 1, wherein the operand consists of M bits, the fractional intermediate result consists of M of the integer bits and M−1 of the fractional bits, N is in the range of 0 to M−1, and M−N−1 least significant bits of the fractional bits are padded with zero's.

3. The method of claim 1, wherein the operand consists of M bits, the maximum shift count is M−1, and the integer result is zero when N is greater than or equal to M.

4. The method of claim 1, wherein the integer result is used to represent the operand divided by $2^N$.

5. The method of claim 1, performed in a single instruction cycle.

6. A method of operating a circuit to right-shift an integer operand in response to an integer N and obtain an integer result rounded towards zero, comprising:

indicating whether the operand is signed or unsigned;

right-shifting the operand by N bit positions using a right-shifter to obtain a fractional intermediate result that includes integer bits and fractional bits when N is within a maximum shift count of the right-shifter, wherein the right-shifting is a logical right-shift when the operand is unsigned and an arithmetic right-shift when the operand is signed;

right-shifting the operand by the maximum shift count using the right-shifter to obtain the fractional intermediate result when N is greater than the maximum shift count;

incrementing the integer bits for providing incremented integer bits as the integer result when any of the fractional bits is a one and the operand is negative and signed, and otherwise providing the integer bits as the integer result when N is within the maximum shift count; and providing the integer result when N is greater than the maximum shift count.

7. The method of claim 6, wherein the operand consists of M bits, the fractional intermediate result consists of M of the integer bits and M−1 of the fractional bits, N is in the range of 0 to M−1, and M−N−1 least significant bits of the fractional bits are padded with zero's.

8. The method of claim 6, wherein the operand consists of M bits, the maximum shift count is M−1, and the integer result is zero when N is greater than or equal to M.

9. The method of claim 6, wherein the integer result is used to represent the operand divided by $2^N$.

10. The method of claim 6, performed in a single instruction cycle.

11. A method of operating a circuit to right-shift an unsigned integer operand in response to an integer N and obtain an integer result rounded away from zero, comprising:

logically right-shifting the operand by N bit positions using a right-shifter to obtain a fractional intermediate result that includes integer bits and fractional bits when N is within a maximum shift count of the right-shifter;

logically right-shifting the operand by the maximum shift count using the right-shifter to obtain the fractional intermediate result when N is greater than the maximum shift count;

incrementing the integer bits for providing incremented integer bits as the integer result when a most significant bit of the fractional bits is a one, and otherwise providing the integer bits as the integer result when N is within the maximum shift count; and providing the integer result when N is greater than the maximum shift count.

12. The method of claim 11, wherein the operand consists of M bits, the fractional intermediate result consists of M of the integer bits and M−1 of the fractional bits, N is in the range of 0 to M−1, and M−N−1 least significant bits of the fractional bits are padded with zero's.

13. The method of claim 11, wherein the operand consists of M bits, the maximum shift count is M−1, and including:

logically right-shifting the operand by M−1 bit positions when N is greater than or equal to M to obtain the fractional intermediate result that includes the integer bits and the fractional bits;

providing the integer bits as the integer result when N is equal to M; and providing zero as the integer result when N is greater than M.

14. The method of claim 11, wherein the integer result is used to represent the operand divided by $2^N$.

15. The method of claim 11, performed in a single instruction cycle.

16. A method of operating a circuit to right-shift a signed integer operand in response to an integer N and obtain an integer result rounded away from zero, comprising:

arithmetically right-shifting the operand by N bit positions using a right-shifter to obtain a fractional intermediate result that includes integer bits and fractional bits when N is within a maximum shift count of the right-shifter;

arithmetically right-shifting the operand by the maximum shift count using the right-shifter to obtain the fractional intermediate result when N is greater than the maximum shift count;

incrementing the integer bits for providing incremented integer bits as the integer result (i) when a most significant bit of the fractional bits is a one and the operand is positive, and (ii) when the most significant bit of the fractional bits is a one and any other of the fractional bits is a one and the operand is negative, and otherwise providing the integer bits as the integer result when N is within the maximum shift count; and providing the integer result when N is greater than the maximum shift count.

17. The method of claim 16, wherein the operand consists of M bits, the fractional intermediate result consists of M of the integer bits and M−1 of the fractional bits, N is in the range of 0 to M−1, and M−N−1 least significant bits of the fractional bits are padded with zero's.

18. The method of claim 16, wherein the operand consists of M bits, the maximum shift count is M−1, and including:

arithmetically right-shifting the operand by M−1 bit positions when N is greater than or equal to M to obtain the fractional intermediate result that includes the integer bits and the fractional bits;

providing the integer bits as the integer result when all the fractional bits are zero's and the operand is negative and N is equal to M; and providing zero as the integer result (i) when the operand is positive, (ii) when any of the fractional bits is a one, and (iii) when N is greater than M.

19. The method of claim 16, wherein the integer result is used to represent the operand divided by $2^N$.

20. The method of claim 16, performed in a single instruction cycle.

21. A method of operating a circuit to right-shift an integer operand consisting of M bits in response to an integer N and obtain an integer result rounded away from zero, comprising:

indicating whether the operand is signed or unsigned;

right-shifting the operand by N bit positions using a right-shifter to obtain a fractional intermediate result that includes integer bits and fractional bits when N is within a maximum shift count of the right-shifter, the maximum shift count is M−1, wherein the right-shifting is a logical right-shift when the operand is unsigned and the right-shifting is an arithmetic right-shift when the operand is signed;

incrementing the integer bits for providing incremented integer bits as the integer result (i) when a most significant bit of the fractional bits is a one and the operand is unsigned, (ii) when the most significant bit of the fractional bits is a one and the operand is positive and signed, and (iii) when the most significant bit of the fractional bits is a one and any other of the fractional bits is a one and the operand is negative and signed, and otherwise providing the integer bits as the integer result when N is within the maximum shift count;

providing the integer result when N is greater than the maximum shift count;

right-shifting the operand by M−1 bit positions when N is greater than or equal to M to obtain the fractional intermediate result that includes the integer bits and the fractional bits, wherein the right-shifting is a logical right-shift when the operand is unsigned and the right-shifting is an arithmetic right-shift when the operand is signed;

providing the integer bits as the integer result (i) when the integer is unsigned and N is equal to M, and (ii) when all the fractional bits are zero's and the operand is negative and signed and N is equal to M; and providing zero as the integer result (i) when the operand is positive and signed (ii) when any of the fractional bits is a one and the operand is negative and signed, and (iii) when N is greater than M.

22. The method of claim 21, wherein the operand consists of M bits, the fractional intermediate result consists of M of the integer bits and M−1 of the fractional bits, N is in the range of 0 to M−1, and M−N−1 least significant bits of the fractional bits are padded with zero's.

23. The method of claim 21, wherein the integer result is used to represent the operand divided by $2^N$.

24. The method of claim 21, performed in a single instruction cycle.

25. An apparatus for right-shifting a signed integer operand in response to an integer N and obtaining an integer result rounded towards zero, comprising:

a right-shifter for arithmetically right-shifting the operand by N bit positions to obtain a fractional intermediate result that includes integer bits and fractional bits when N is within a maximum shift count of the right-shifter;

a control circuit for generating an increment signal with a first logical value when a most significant bit of the fractional bits is a one and the operand is negative, and otherwise with a second logical value when N is within the maximum shift count; and an increment circuit for incrementing the integer bits and providing the incremented integer bits as the integer result when the increment signal has the first logical value, and for providing the integer bits as the integer result when the increment signal has the second logical value when N is within the maximum shift count, wherein the increment circuit also provides the integer result when N is greater than the maximum shift count;

wherein the operand consists of M bits, the maximum shift count is M−1, the right-shifter arithmetically right-shifts the operand by N bit positions to obtain the fractional intermediate result when N is less than M, the right-shifter right-shifts the operand by M−1 bit positions when N is greater than or equal to M, the increment circuit increments the integer bits and provides the incremented integer bits as the integer result when the increment signal has the first logical value and N is less than M, the increment circuit provides the integer bits as the integer result when the increment signal has the second logical value and N is less than M, and the increment circuit provides zero as the integer result when N is greater than or equal to M.

26. The apparatus of claim 25, wherein the operand consists of M bits, the fractional intermediate result consists of M of the integer bits and M−1 of the fractional bits, N is in the range of 0 to M−1, and M−N−1 least significant bits of the fractional bits are padded with zero's.

27. The apparatus of claim 25, wherein the integer result is used to represent the operand divided by $2^N$.

28. The apparatus of claim 25, wherein the operand is right-shifted and the integer result is provided in a single instruction cycle.

29. An apparatus for right-shifting an integer operand in response to an integer N and obtaining an integer result rounded towards zero, comprising:

a right-shifter for right-shifting the operand by N bit positions to obtain a fractional intermediate result that includes integer bits and fractional bits when N is within a maximum shift count of the right-shifter, wherein the right-shifter logically right-shifts the operand when the operand is unsigned, and the right-shifter arithmetically right-shifts the operand when the operand is signed;

a control circuit for generating an increment signal with a first logical value when any of the fractional bits is a one and the operand is negative and signed, and otherwise with a second logical value when N is within the maximum shift count; and an increment circuit for incrementing the integer bits and providing the incremented integer bits as the integer result when the increment signal has the first logical value, and for providing the integer bits as the integer result when the increment signal has the second logical value when N is within the maximum shift count, wherein the increment circuit also provides the integer result when N is greater than the maximum shift count;

wherein the operand consists of M bits, the maximum shift count is M−1, the right-shifter logically right-shifts the operand by N bit positions to obtain the fractional intermediate result when the operand is unsigned and N is less than M, the right-shifter arithmetically right-shifts the operand by N bit positions to obtain the fractional intermediate result when the operand is signed and N is less than M, the right-shifter right-shifts the operand by M−1 bit positions when N is greater than or equal to M, the increment circuit increments the integer bits and provides the incremented integer bits as the integer result when the increment signal has the first logical value and N is less than M, the increment circuit provides the integer bits as the integer result when the increment signal has the second logical value and N is less than M, and the increment circuit provides zero as the integer result when N is greater than or equal to M.

30. The apparatus of claim 29 wherein the operand consists of M bits, the fractional intermediate result consists of M of the integer bits and M−1 of the fractional bits, N is in the range of 0 to M−1, and M−N−1 least significant bits of the fractional bits are padded with zero's.

31. The apparatus of claim 29 wherein the integer result is used to represent the operand divided by $2^N$.

32. The apparatus of claim 29, wherein the operand is right-shifted and the integer result is provided in a single instruction cycle.

33. An apparatus for right-shifting an unsigned integer operand in response to an integer N and obtaining an integer result rounded away from zero, comprising:

a right-shifter for logically right-shifting the operand by N bit positions to obtain a fractional intermediate result that includes integer bits and fractional bits when N is within a maximum shift count of the right-shifter;

a control circuit for generating an increment signal with a first logical value when a most significant bit of the fractional bits is a one, and otherwise with a second logical value when N is within the maximum shift count; and an increment circuit for incrementing the integer bits and providing the incremented integer bits as the integer result when the increment signal has the first logical value, and for providing the integer bits as the integer result when the increment signal has the second logical value when N is within the maximum shift count, wherein the increment circuit also provides the integer result when N is greater than the maximum shift count;

wherein the operand consists of M bits, the maximum shift count is M−1, the right-shifter logically right-shifts the operand by N bit positions to obtain the fractional intermediate result when N is less than M, the right-shifter right-shifts the operand by M−1 bit positions to obtain the integer bits and the fractional bits when N is greater than or equal to M, the increment circuit increments the integer bits and provides the incremented integer bits as the integer result when the increment signal has the first logical value and N is less than M, the increment circuit provides the integer bits as the integer result when the increment signal has the second logical value and N is less than M, the increment circuit provides the integer bits as the integer result when N is equal to M, and the increment circuit provides zero as the integer result when N is greater than M.

34. The apparatus of claim 33, wherein the operand consists of M bits, the fractional intermediate result consists of M of the integer bits and M−1 of the fractional bits, N is in the range of 0 to M−1, and M−N−1 least significant bits of the fractional bits are padded with zero's.

35. The apparatus of claim 33, wherein the integer result is used to represent the operand divided by $2^N$.

36. The apparatus of claim 33, wherein the operand is right-shifted and the integer result is provided in a single instruction cycle.

37. An apparatus for right-shifting a signed integer operand in response to an integer N and obtaining an integer result rounded away from zero, comprising:

a right-shifter for arithmetically right-shifting the operand by N bit positions to obtain a fractional intermediate result that includes integer bits and fractional bits when N is within a maximum shift count of the right-shifter;

a control circuit for generating an increment signal with a first logical value (i) when a most significant bit of the fractional bits is a one and the operand is positive, and (ii) when the most significant bit of the fractional bits is a one and any other of the fractional bits is a one and the operand is negative, and otherwise with the second logical value when N is within the maximum shift count; and an increment circuit for incrementing the integer bits and providing the incremented integer bits as the integer result when the increment signal has the first logical value, and for providing the integer bits as the integer result when the increment signal has the second logical value when N is within the maximum shift count, wherein the increment circuit also provides the integer result when N is greater than the maximum shift count;

wherein the operand consists of M bits the maximum shift count is M−1, the right-shifter arithmetically right-shifts the operand by N bit positions to obtain the fractional intermediate result when N is less than Me the right-shifter right-shifts the operand by M−1 bit positions to obtain the integer bits and the fractional bits when N is greater than or equal to M, the increment circuit increments the integer bits and provides the incremented integer bits as the integer result when the increment signal has the first logical value and N is less than M, the increment circuit provides the integer bits as the integer result when the increment signal has the second logical value and N is less than M, the increment circuit provides the integer bits as the integer result when all the fractional bits are zero's and the operand is negative and N is equal to M, and the increment circuit provides zero as the integer result (i) when the operand is positive, (ii) when any of the fractional bits is a one, and (iii) when N is greater than M.

38. The apparatus of claim 37, wherein the operand consists of M bits, the fractional intermediate result consists of M of the integer bits and M−1 of the fractional bits, N is in the range of 0 to M−1, and M−N−1 least significant bits of the fractional bits are padded with zero's.

39. The apparatus of claim 37, wherein the integer result is used to represent the operand divided by $2^N$.

40. The apparatus of claim 37, wherein the operand is right-shifted and the integer result is provided in a single instruction cycle.

41. An apparatus for right-shifting an integer operand in response to an integer N and obtaining an integer result rounded away from zero, comprising:

a right-shifter for right-shifting the operand by N bit positions to obtain a fractional intermediate result that includes integer bits and fractional bits when N is within a maximum shift count of the right-shifter, wherein the right-shifter logically right-shifts the operand when the operand is unsigned, and the right-shifter arithmetically right-shifts the operand when the operand is signed;

a control circuit for generating an increment signal with a first logical value (i) when a most significant bit of the fractional bits is a one and the operand is unsigned, (ii) when the most significant bit of the fractional bits is a one and the operand is positive and signed, and (iii) when the most significant bit of the fractional bits is a one and any other of the fractional bits is a one and the operand is negative and signed, and otherwise with a second logical value when N is within the maximum shift count; and an increment circuit for incrementing the integer bits and providing the incremented integer bits as the integer result when the increment signal has the first logical value, and for providing the integer bits as the integer result when the increment signal has the second logical value when N is within the maximum shift count, wherein the increment circuit provides the integer result when N is greater than the maximum shift count;

wherein the operand consists of M bits, the maximum shift count is M−1, the right-shifter logically right-shifts the operand by N bit positions to obtain the fractional intermediate result when the operand is unsigned and N is less than M, the right-shifter arithmetically right-shifts the operand by N bit positions to obtain the fractional intermediate result when the operand is signed and N is less than M, the right-shifter right-shifts the operand by M−1 bit positions to obtain the integer bits and the fractional bits when N is greater than or equal to M, the increment circuit increments the integer bits and provides the incremented integer bits as the integer result when the increment signal has the first logical value and N is less than M, the increment circuit provides the integer bits as the integer result when the increment signal has the second logical value and N is less than M, the increment circuit provides the integer bits as the integer result (i) when the integer is unsigned and N is equal to M, and (ii) when all the fractional bits are zero's and the operand is negative and signed and N is equal to M, and the increment circuit provides zero as the integer result (i) when the operand is positive and signed, (ii) when any of the fractional bits is a one and the operand is negative and signed, and (iii) when N is greater than M.

42. The apparatus of claim 41, wherein the operand consists of M bits, the fractional intermediate result consists of M of the integer bits and M−1 of the fractional bits, N is in the range of 0 to M−1, and M−N−1 least significant bits of the fractional bits are padded with zero's.

43. The apparatus of claim 41, wherein the integer result is used to represent the operand divided by $2^N$.

44. The apparatus of claim 41, wherein the operand is right-shifted and the integer m result is provided in a single instruction cycle.

45. An apparatus for right-shifting an M-bit integer operand in response to an integer N with greater than $\log_2(M)$ bit positions and obtaining a rounded integer result, comprising:

a right-shifter for right-shifting the operand to obtain a fractional intermediate result that includes integer bits and fractional bits, wherein the right-shifter right shifts the operand by (i) N bit positions when N is less than M, and (ii) M−1 bit positions when N is greater than or equal to M;

a control circuit for generating an increment signal in response to at least one of the fractional bits; and an increment circuit for (i) incrementing the integer bits and providing the incremented integer bits as the integer result when the increment signal has a first logical value and N is less than M, (ii) providing the integer bits as the integer result when the increment signal has a second logical value and N is less than M, (iii) providing a value as the integer result when N is equal to M, and (iv) providing zero as the integer result when N is greater than M.

46. The apparatus of claim 45, wherein the value is zero when integer result is rounded towards zero.

47. The apparatus of claim 45, wherein the value is the integer bits when the operand is unsigned and the integer result is rounded away from zero.

48. The apparatus of claim 45, wherein when the operand is unsigned the value is (i) zero when integer result is rounded towards zero, and (ii) the integer bits when the integer result is rounded away from zero.

49. The apparatus of claim 45, wherein when the operand is signed and the integer result is rounded away from zero the value is (i) the integer bits when all the fractional bits are zero's and the operand is negative, (ii) zero when any of the fractional bits is a one and the operand is negative, and (iii) zero when the operand is positive.

50. The apparatus of claim 45, wherein when the operand is signed (A) when the integer result is rounded towards zero the value is zero, and (B) when the integer result is rounded away from zero the value is (i) the integer bits when all the fractional bits are zero's and the operand is negative, (ii) zero when any of the fractional bits is a one and the operand is negative, and (iii) zero when the operand is positive.

51. The apparatus of claim 45, wherein when the operand is unsigned and the integer result is rounded away from zero the value is the integer bits, and when the operand is signed (A) when the integer result is rounded towards zero the value is zero, and (B) when the integer result is rounded away from zero the value is (i) the integer bits when all the fractional bits are zero's and the operand is negative, (ii) zero when any of the fractional bits is a one and the operand is negative, and (iii) zero when the operand is positive.

52. The apparatus of claim 45, wherein when the integer result is rounded away from zero the value is (i) the integer bits when the operand is unsigned, (ii) the integer bits when all the fractional bits are zero's and the operand is signed and negative, (iii) zero when any of the fractional bits is a one and the operand is signed and negative, and (iv) zero when the operand is signed and positive.

53. The apparatus of claim 45, wherein when the integer result is rounded towards zero the value is zero, and when the integer result is rounded away from zero the value is (i) the integer bits when the operand is unsigned, (ii) the integer bits when all the fractional bits are zero's and the operand is signed and negative, (iii) zero when any of the fractional bits is a one and the operand is signed and negative, and (iv) zero when the operand is signed and positive.

54. The apparatus of claim 45, wherein the operand is right-shifted and the integer result is provided in a single instruction cycle.

* * * * *